(12) United States Patent
Taniai et al.

(10) Patent No.: US 12,374,095 B2
(45) Date of Patent: Jul. 29, 2025

(54) MODEL GENERATION APPARATUS, REGRESSION APPARATUS, MODEL GENERATION METHOD, AND COMPUTER-READABLE STORAGE MEDIUM STORING A MODEL GENERATION PROGRAM

(71) Applicant: OMRON Corporation, Kyoto (JP)

(72) Inventors: Tatsunori Taniai, Tokyo (JP); Ryo Yonetani, Tokyo (JP)

(73) Assignee: OMRON Corporation, Kyoto (JP)

( * ) Notice: Subject to any disclaimer, the term of this patent is extended or adjusted under 35 U.S.C. 154(b) by 408 days.

(21) Appl. No.: 18/002,684

(22) PCT Filed: Jun. 30, 2021

(86) PCT No.: PCT/JP2021/024701
§ 371 (c)(1),
(2) Date: Dec. 21, 2022

(87) PCT Pub. No.: WO2022/004773
PCT Pub. Date: Jan. 6, 2022

(65) Prior Publication Data
US 2023/0245437 A1    Aug. 3, 2023

(30) Foreign Application Priority Data
Jul. 2, 2020    (JP) ................. 2020-114595

(51) Int. Cl.
*G06V 10/82* (2022.01)
*G06V 10/766* (2022.01)
*G06V 10/77* (2022.01)

(52) U.S. Cl.
CPC ............ *G06V 10/82* (2022.01); *G06V 10/766* (2022.01); *G06V 10/7715* (2022.01)

(58) Field of Classification Search
CPC .. G06V 10/82; G06V 10/766; G06V 10/7715; G06N 3/084; G06N 3/09;
(Continued)

(56) References Cited

U.S. PATENT DOCUMENTS 5,271,090 A    12/1993   Boser
10,467,504 B1 *  11/2019   Hamedi .................. G06F 18/22
(Continued)

FOREIGN PATENT DOCUMENTS

JP    2018-514856 A    6/2018
WO    WO-2021068325 A1 *  4/2021    ............. G06N 3/045

OTHER PUBLICATIONS

Alex Kendall et al., "End-to-End Learning of Geometry and Context for Deep Stereo Regression", ICCV, Mar. 13, 2017, p. 1-10; Concise explanation of relevance provided in the specification.
(Continued)

*Primary Examiner* — Jennifer Mehmood
*Assistant Examiner* — Pardis Sohraby
(74) *Attorney, Agent, or Firm* — METROLEX IP LAW GROUP, PLLC; Robert L. Scott, Esq.

(57) ABSTRACT

A model generation apparatus trains, through machine learning, a neural network module that includes an extraction operation to extract an element satisfying a predetermined condition from a set of targets. In the machine learning, the model generation apparatus performs the extraction operation in a phase of forward propagation with the neural network module, and replaces, in a phase of backpropagation, the extraction operation with a differentiable alternative operation and differentiates the alternative operation to compute an approximate gradient corresponding to differentiation for the extraction operation.

13 Claims, 8 Drawing Sheets

(58) Field of Classification Search
CPC .............. G06T 7/0008; G06T 7/20; G06T 2207/10021; G06T 7/593; G06T 7/70; G06T 2207/10024; G06T 2207/10028; G06T 2207/10048; G06T 7/55; G06T 2207/20076; G06T 2207/20084; G06T 2207/30196; G06T 2207/30261
USPC ........................................................ 382/155
See application file for complete search history.

(56) References Cited

U.S. PATENT DOCUMENTS

| | | | |
|---|---|---|---|
| 2016/0358038 A1 | 12/2016 | Jaderberg et al. | |
| 2018/0330185 A1* | 11/2018 | Jaderberg | G06N 3/088 |
| 2021/0034909 A1 | 2/2021 | Jaderberg et al. | |
| 2021/0407125 A1* | 12/2021 | Mahendran | G06V 20/20 |
| 2023/0268033 A1* | 8/2023 | Jaganathan | G06F 16/58 |
| | | | 706/20 |

OTHER PUBLICATIONS

An English translation of the International Search Report ("ISR") of PCT/JP2021/024701 mailed on Sep. 14, 2021.

The Written Opinion("WO") of PCT/JP2021/024701 mailed on Sep. 14, 2021.

Stepan Tulyakov et al, "Practical Deep Stereo (PDS): Toward applications-friendly deep stereo matching", arxiv.org, Cornell University Library, 201 OLIN Library Cornell University Ithaca, NY 14853, Jun. 5, 2018, XP081142027; Cited in ESSR mailed on Jan. 31, 2024 in a counterpart European patent application.

Aditya Grover et al: "Stochastic Optimization of Sorting Networks via Continuous Relaxations", arxiv.org, Cornell University Library, 201 OLIN Library Cornell University Ithaca, NY 14853, Mar. 21, 2019, XP081269615; Cited in ESSR mailed on Jan. 31, 2024 in a counterpart European patent application.

An extended European search report (EESR) issued on Jan. 31, 2024 in a counterpart European patent application.

* cited by examiner

MODEL GENERATION APPARATUS, REGRESSION APPARATUS, MODEL GENERATION METHOD, AND COMPUTER-READABLE STORAGE MEDIUM STORING A MODEL GENERATION PROGRAM

FIELD

The present disclosure relates to a model generation apparatus, a regression apparatus, a model generation method, and computer-readable storage medium storing a model generation program.

BACKGROUND

Trained neural networks have been used in various situations in which real numbers are computed from images using regression. For example, Non-Patent Literature 1 describes a method for computing disparities between multiple images using a trained neural network. More specifically, the method uses the trained neural network to compute the likelihood of each of multiple candidate values (discrete values) being the disparity to be computed using regression and computes an expected value based on the computed likelihoods. This method can compute the disparities as real numbers using regression.

CITATION LIST

Non-Patent Literature

Non-Patent Literature 1: Alex Kendall; Hayk Martirosyan; Saumitro Dasgupta; Peter Henry; Ryan Kennedy; Abraham Bachrach; Adam Bry, End-to-End Learning of Geometry and Context for Deep Stereo Regression. ICCV 2017, 66-75

SUMMARY

The inventors have noticed some issues below with a known regression method using a trained neural network described in, for example, Non-Patent Literature 1. The process of computing a real number using regression with a trained neural network may derive multiple candidates with certain degrees of likelihood. In this case, the real number computed using regression may be affected by unintended candidates and may have lower accuracy. In computing the disparities as described above, for example, computed likelihoods may have multiple peaks (in other words, relatively high likelihoods may be computed for multiple candidate values). In this case, the computed expected values may be affected by such peak values and deviate from their true values. The disparities computed using regression may have lower accuracy.

One or more embodiments may be directed to a technique for improving the accuracy of computing a real number from one or more images using regression with a neural network.

The technique according to one or more embodiments may have structures described below.

A model generation apparatus according to one or more embodiments includes a data obtainer that obtains a plurality of training data pairs each including a combination of one or more training images and true information indicating ground truth for a real number to be computed using regression from the one or more training images, and a training unit that trains a neural network module through machine learning using the plurality of training data pairs. The neural network module includes an extraction operation to extract an element satisfying a predetermined condition from a set of targets. The machine learning includes training the neural network module on each of the plurality of training data pairs to compute, from the one or more training images using regression, a value fitting the ground truth indicated by the true information. The training unit performs, in the machine learning, the extraction operation in a phase of forward propagation with the neural network module and replaces, in a phase of backpropagation, the extraction operation with a differentiable alternative operation and differentiates the alternative operation to compute an approximate gradient corresponding to differentiation for the extraction operation.

The above issue may result from candidates other than the most promising candidate (e.g., candidates with the second or subsequent highest likelihood). In response to the above issue, the operation process with the neural network may simply include an operation to extract an element that satisfies a predetermined condition from a set of targets. In computing the disparities as described above, for example, an element that allocates the maximum value to the likelihood may be extracted, and an expected value may be computed in the neighborhood of the extracted element alone. This method may allow the computation to be less susceptible to candidates other than the most promising candidate, thus may improve the accuracy of regression.

However, when a regression (forward propagation operation) process with the neural network includes the above extraction operation, the neural network including the extraction operation is trained through machine learning. To train a neural network through machine learning (in other words, to backpropagate the gradient of an error with backpropagation), all operations performed until a real number is computed using regression with the neural network are to be differentiable. However, the above extraction operation is non-differentiable. The above simple method thus may not train a neural network through machine learning, and thus may not generate a trained neural network.

The above structure uses a neural network module including an operation to extract an element that satisfies a predetermined condition from a set of targets. During such machine learning, the structure performs the extraction operation without any additional operation in the phase of forward propagation, and replaces, in the phase of backpropagation, the extraction operation with a differentiable alternative operation and differentiates the resulting alternative operation to compute an approximate gradient corresponding to differentiation for the extraction operation. This may allow the neural network module including the non-differentiable extraction operation to be trained through machine learning appropriately. The above structure may thus generate a trained neural network module with improved accuracy of computing a real number using regression from one or more images.

In the model generation apparatus according to one or more embodiments, the neural network module may further include an operation to compute a likelihood of each of a plurality of candidate values being a real number to be computed using regression. The extraction operation may include extracting an element of a maximum from the computed likelihoods. The above structure may improve the accuracy of regression in computing a real number using regression from an expected value based on the likelihood of each candidate value.

In the model generation apparatus according to one or more embodiments, the one or more training images may include a plurality of images captured at different positions. The real number to be computed using regression may be a disparity between the plurality of images. The above structure may generate a trained neural network module with improved accuracy of computing disparities between multiple images using regression.

In the model generation apparatus according to one or more embodiments, the one or more training images may include a plurality of images captured continuously. The real number to be computed using regression may be an estimate for a motion of an object in the plurality of images. The above structure may generate a trained neural network module with improved accuracy of computing a motion of an object in multiple consecutive images using regression.

In the model generation apparatus according to one or more embodiments, the one or more training images may include images of an object. The real number to be computed using regression may be an estimate for a detected position of the object. The above structure may generate a trained neural network module with improved accuracy of computing the detected position of an object using regression from images.

One or more embodiments are not limited to the above model generation apparatus. One or more embodiments may be directed to a regression apparatus with the trained neural network module generated by the above model generation apparatus. For example, a regression apparatus according to one or more embodiments includes an image obtainer that obtains one or more target images, a regression unit that computes a real number using regression from the obtained one or more target images with the trained neural network module generated by the model generation apparatus described above, and an output unit that outputs information about a regression result. The regression apparatus is replaceable by, for example, a disparity measurement apparatus, a motion measurement apparatus, or a detection apparatus as appropriate for the type of regression task used in a situation.

In one or more embodiments, another form of the model generation apparatus or the regression apparatus according to one or more embodiments may be an information processing method, a program, or a storage medium storing the program readable by a computer or another device or machine for implementing some or all of the components described above. The computer-readable storage medium includes a medium storing a program or other information in an electrical, magnetic, optical, mechanical, or chemical manner. A regression system according to one or more embodiments may include the model generation apparatus and the regression apparatus according to one or more embodiments.

For example, a model generation method according one or more embodiments is an information processing method implementable with a computer. The method includes obtaining a plurality of training data pairs each including a combination of one or more training images and true information indicating ground truth for a real number to be computed using regression from the one or more training images, and training a neural network module through machine learning using the plurality of training data pairs. The neural network module includes an extraction operation to extract an element satisfying a predetermined condition from a set of targets. The machine learning includes training the neural network module on each of the plurality of training data pairs to compute, from the one or more training images using regression, a value fitting the ground truth indicated by the true information. The training the neural network module includes performing, in the machine learning, the extraction operation in a phase of forward propagation with the neural network module, and replacing, in a phase of backpropagation, the extraction operation with a differentiable alternative operation and differentiating the alternative operation to compute an approximate gradient corresponding to differentiation for the extraction operation.

For example, a model generation program according to one or more embodiments is a program for causing a computer to perform operations including obtaining a plurality of training data pairs each including a combination of one or more training images and true information indicating ground truth for a real number to be computed using regression from the one or more training images, and training a neural network module through machine learning using the plurality of training data pairs. The neural network module includes an extraction operation to extract an element satisfying a predetermined condition from a set of targets. The machine learning includes training the neural network module on each of the plurality of training data pairs to compute, from the one or more training images using regression, a value fitting the ground truth indicated by the true information. The training the neural network module includes performing, in the machine learning, the extraction operation in a phase of forward propagation with the neural network module, and replacing, in a phase of backpropagation, the extraction operation with a differentiable alternative operation and differentiating the alternative operation to compute an approximate gradient corresponding to differentiation for the extraction operation.

The technique according to one or more embodiments may improve the accuracy of computing a real number using regression from one or more images with a neural network.

DETAILED DESCRIPTION

One or more embodiments of the present invention (hereafter, the present embodiment) will now be described with reference to the drawings. The embodiments described below are mere examples of the present invention in all aspects. The embodiments may be variously modified or altered without departing from the scope of the present invention. More specifically, the present invention may be implemented as appropriate using the configuration specific to each embodiment. Although data used in the present embodiment is described in a natural language, such data may be specifically defined using any computer-readable language, such as a pseudo language, commands, parameters, or a machine language.

1. Example Use

Figure 1:
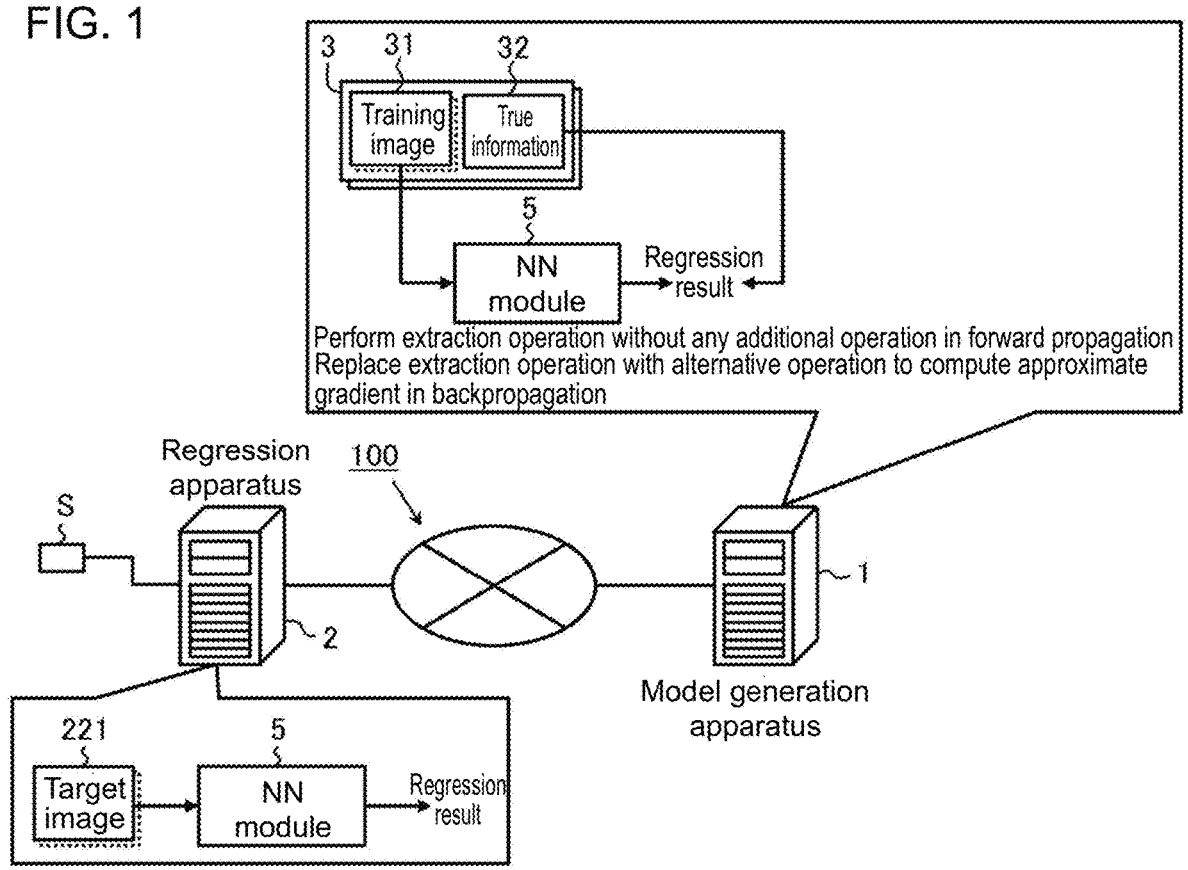
FIG. 1 is a schematic diagram illustrating an example situation in one or more embodiments.

FIG. 1 is a schematic diagram of an example situation in one or more embodiments of the present invention. As shown in FIG. 1, a regression system 100 according to the present embodiment includes a model generation apparatus 1 and a regression apparatus 2.

The model generation apparatus 1 according to the present embodiment is a computer that generates a neural network (NN in the figures) module 5 trained through machine learning. The model generation apparatus 1 according to the present embodiment obtains multiple training data pairs 3 each including a combination of one or more training images 31 and true information 32 indicating ground truth for a real number to be computed using regression from the training images 31. Each training data pair 3 is used for machine learning.

Each training data pair 3 may include any number of training images 31 determined as appropriate for the type of a regression task to be trained through machine learning. The regression task to undergo machine learning may include any inference task (regression task) of computing one or more real numbers using regression from one or more images. The regression task may include, for example, estimating disparities between multiple images, estimating a motion of an object in multiple images captured continuously, and detecting an object in an image. In one example, each training data pair 3 may include two training images 31 for a regression task of estimating the disparity between two images. The true information 32 has any appropriate structure indicating ground truth for the regression task on the training images 31. Multiple real numbers may be computed using regression, instead of a single real number.

The model generation apparatus 1 according to the present embodiment trains the neural network module 5 through machine learning using the multiple training data pairs 3. The neural network module 5 includes an operation (hereafter also referred to as an extraction operation) to extract an element that satisfies a predetermined condition from a set of targets. The extraction operation may be any non-differentiable operation for narrowing multiple elements computed in a regression operation process to selected elements (e.g., intended elements) and may be determined as appropriate in each embodiment. The extraction operation may be, for example, an operation to extract an element of a maximum (an argument of the maximum), an operation to extract an element of a minimum (an argument of the minimum), or an operation to extract an element of a median (50 percentile) or another specific percentile. Machine learning includes training the neural network module 5 on each training data pair 3 to compute, from the training images 31 using regression, a value that fits the ground truth indicated by the true information 32.

More specifically, the neural network module 5 includes multiple operation parameters including, for example, connection weights between neurons and the threshold of each neuron. The model generation apparatus 1 performs, with the neural network module 5, trial regression of a real number with the training images 31 included in each training data pair 3. More specifically, the model generation apparatus 1 inputs, for each training data pair 3, the training images 31 into the neural network module 5 and performs a forward propagation operation with the neural network module 5. The model generation apparatus 1 computes an error between the regression result obtained in the trial and the ground truth indicated by the corresponding true information 32. The model generation apparatus 1 adjusts the value of each operation parameter by backpropagating the gradient of the computed error. Training the neural network module 5 includes adjusting the value of each operation parameter through the above series of processes (the trial regression process using forward propagation and the process of adjusting the operation parameters using backpropagation).

The model generation apparatus 1 performs the extraction operation without any additional operation in the phase of forward propagation (trial regression) in such machine learning, but replaces, in the phase of backpropagation (operation parameter adjustment), the extraction operation with a differentiable alternative operation and differentiates the resulting alternative operation to compute an approximate gradient corresponding to differentiation for the extraction operation. More specifically, in the phase of trial regression in the machine learning process, the model generation apparatus 1 performs the forward propagation operation (performs the extraction operation without any additional operation) with the neural network module 5, including the extraction operation, to obtain a regression result for the training images 31 included in each training data pair 3. The extraction operation is non-differentiable and cannot be directly used to backpropagate the gradient of the error. In the phase of backpropagation of the gradient of the error derived in the trial phase, the model generation apparatus 1 thus uses, as a result of differentiation for the extraction operation, the approximate gradient computed by differentiating the alternative operation and backpropagates the gradient of the error to adjust the value of each operation parameter. The alternative operation may be any operation that can compute the approximate gradient of the extraction operation and may be determined as appropriate in each embodiment. For the extraction operation to extract an element of a maximum or a minimum, the alternative operation may include a softmax function or a function similar to the softmax function, and the approximate gradient may be a gradient of such a function. For the extraction operation to extract an element of a median or another specific percentile, the alternative operation may be a differentiable sorting operation (e.g., the sorting operation described in the reference, Aditya Grover; Eric Wang; Aaron Zweig; Stefano Ermon, Stochastic Optimization of Sorting Networks via Continuous Relaxations. ICLR 2019, https://arxiv.org/abs/1903.08850) or an operation similar to the sorting operation, and the approximate gradient may be a gradient of such an operation. Such machine learning generates the trained neural network module 5 capable of computing one or more real numbers using regression from one or more images.

The regression apparatus 2 according to the present embodiment is a computer that performs a regression task on one or more images with the trained neural network module 5. In the present embodiment, the regression apparatus 2 obtains one or more target images 221. In the example of FIG. 1, the regression apparatus 2 is connected to a camera S. The regression apparatus 2 obtains one or more target images 221 from the camera S.

The regression apparatus 2 computes a real number using regression from the obtained target images 221 with the trained neural network module 5. More specifically, as in the above trial phase, the regression apparatus 2 inputs the obtained target images 221 into the trained neural network module 5 and performs a forward propagation operation with the trained neural network module 5, including the extraction operation. The regression apparatus 2 performs the extraction operation without any additional operation in this forward propagation operation. The regression apparatus 2 can obtain a regression result as a result of this operation. The regression apparatus 2 then outputs information about the regression result. The regression apparatus 2 according to the present embodiment is replaceable by, for example, a disparity measurement apparatus, a motion measurement apparatus, or a detection apparatus as appropriate for the type of regression task used in a situation.

As described above, the model generation apparatus 1 according to the present embodiment performs, in the machine learning process, the extraction operation without any additional operation in the phase of forward propagation, but replaces, in the phase of backpropagation, the extraction operation with the differentiable alternative operation and differentiates the resulting alternative operation to compute the approximate gradient corresponding to differentiation for the extraction operation. This allows the neural network module 5 including the non-differentiable extraction operation to be trained through machine learning appropriately. The regression apparatus 2 according to the present embodiment performs the extraction operation in the regression operation process with the trained neural network module 5 generated through such machine learning to allow the computation to be less susceptible to candidates other than the most promising candidate, thus improving the accuracy of regression.

In the example of FIG. 1, the model generation apparatus 1 and the regression apparatus 2 are connected to each other with a network. The network may be selected as appropriate from, for example, the Internet, a wireless communication network, a mobile communication network, a telephone network, and a dedicated network. The model generation apparatus 1 and the regression apparatus 2 may communicate data between them in any other manner selected as appropriate in each embodiment. For example, the model generation apparatus 1 and the regression apparatus 2 may communicate data between them using a storage medium.

In the example of FIG. 1, the model generation apparatus 1 and the regression apparatus 2 are separate computers. However, the regression system 100 according to the present embodiment may have any other structure determined as appropriate in each embodiment. For example, the model generation apparatus 1 and the regression apparatus 2 may be integrated into a single computer. For example, at least one of the model generation apparatus 1 or the regression apparatus 2 may include multiple computers.

2. Example Structure

Hardware Configuration
Model Generation Apparatus

Figure 2:
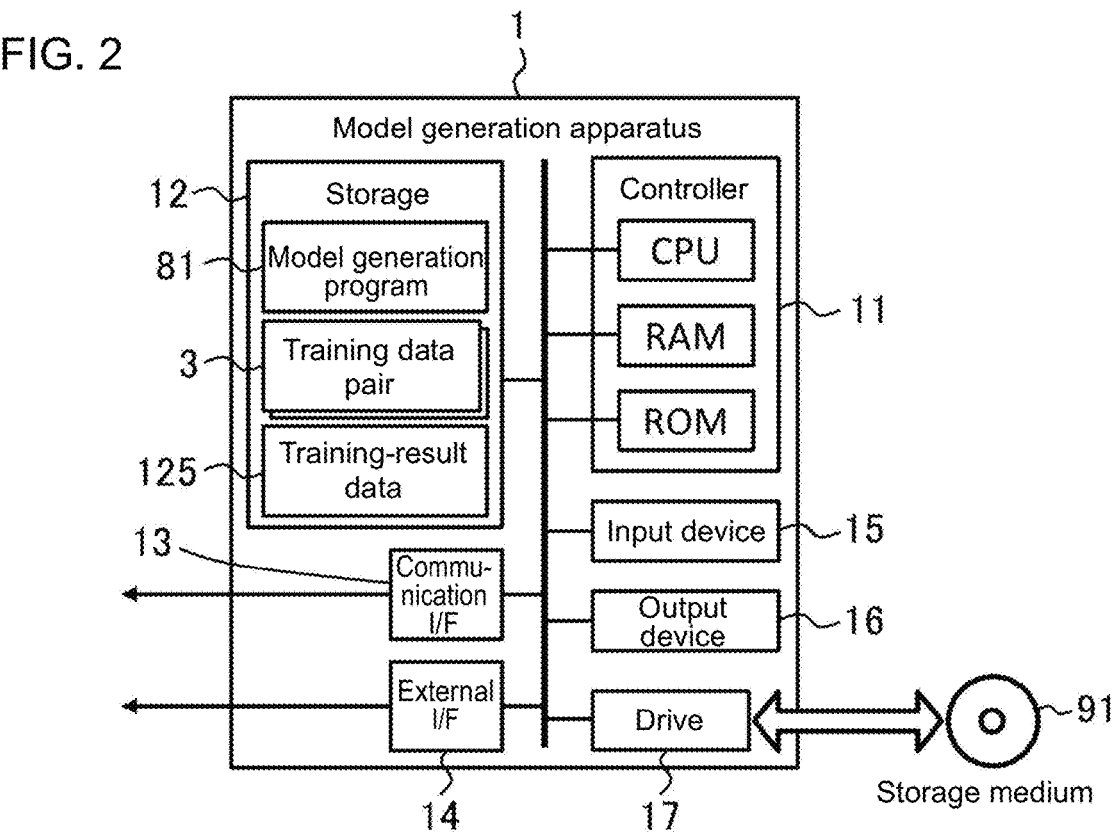
FIG. 2 is a schematic diagram illustrating a model generation apparatus according to one or more embodiments showing an example hardware configuration.

FIG. 2 is a schematic diagram of the model generation apparatus 1 according to the present embodiment showing its example hardware configuration. As shown in FIG. 2, the model generation apparatus 1 according to the present embodiment is a computer including a controller 11, a storage 12, a communication interface 13, an external interface 14, an input device 15, an output device 16, and a drive 17 that are electrically connected to one another. In FIG. 2, the communication interface and the external interface are abbreviated as a communication I/F and an external I/F.

The controller 11 includes, for example, a central processing unit (CPU) as a hardware processor, a random-access memory (RAM), and a read-only memory (ROM). The controller 11 performs information processing based on programs and various items of data. The storage 12, as an example of a memory, includes, for example, a hard disk drive or a solid-state drive. In the present embodiment, the storage 12 stores various items of information such as a model generation program 81, the multiple training data pairs 3, and training-result data 125.

The model generation program 81 causes the model generation apparatus 1 to perform information processing (FIG. 6) for machine learning to generate the trained neural network module 5 (described later). The model generation program 81 includes a series of commands for the information processing. The multiple training data pairs 3 are used to generate the trained neural network module 5. The training-result data 125 indicates information about the neural network module 5 generated by training. In the present embodiment, the training-result data 125 results from the model generation program 81 being executed. This will be described in detail later.

The communication interface 13 is, for example, a wired local area network (LAN) module or a wireless LAN module for wired or wireless communication through a network. The model generation apparatus 1 may use the communication interface 13 to communicate data with another information processing device through a network. The external interface 14 is an interface for connection to an external device and may be, for example, a universal serial bus (USB) port or a dedicated port. The type and the number of external interfaces 14 may be selected as appropriate. The model generation apparatus 1 may be connected to a camera for capturing training images 31 with at least one of the communication interface 13 or the external interface 14.

The input device 15 includes, for example, a mouse and a keyboard. The output device 16 includes, for example, a display and a speaker. An operator such as a user may operate the model generation apparatus 1 using the input device 15 and the output device 16.

The drive 17 is, for example, a compact disc (CD) drive or a digital versatile disc (DVD) drive for reading programs or other information stored in a storage medium 91. The storage medium 91 stores programs or other information in an electrical, magnetic, optical, mechanical, or chemical manner to allow a computer or another device or machine to read the stored programs or other information. At least one of the above model generation program 81 or the multiple training data pairs 3 may be stored in the storage medium 91. The model generation apparatus 1 may obtain at least one of the model generation program 81 or the multiple training data pairs 3 from the storage medium 91. In FIG. 2, the storage medium 91 is a disc storage, such as a CD or a DVD. However, the storage medium 91 is not limited to a disc storage. One example of the storage medium other than a disc storage is a semiconductor memory such as a flash memory. The drive 17 may be of any type selected as appropriate for the type of the storage medium 91.

For the specific hardware configuration of the model generation apparatus 1, components may be eliminated, replaced, or added as appropriate in each embodiment. For example, the controller 11 may include multiple hardware processors. Each hardware processor may include a microprocessor, a field-programmable gate array (FPGA), a digital signal processor (DSP), or other processors. The storage 12 may be the RAM and the ROM included in the controller 11. At least one of the communication interface 13, the external interface 14, the input device 15, the output device 16, or the drive 17 may be eliminated. The model generation apparatus 1 may include multiple computers. In this case, each computer may have the same or a different hardware configuration. The model generation apparatus 1 may also be an information processor dedicated to a service to be provided, or may be a general-purpose server or a general-purpose personal computer (PC).

Regression Apparatus

Figure 3:
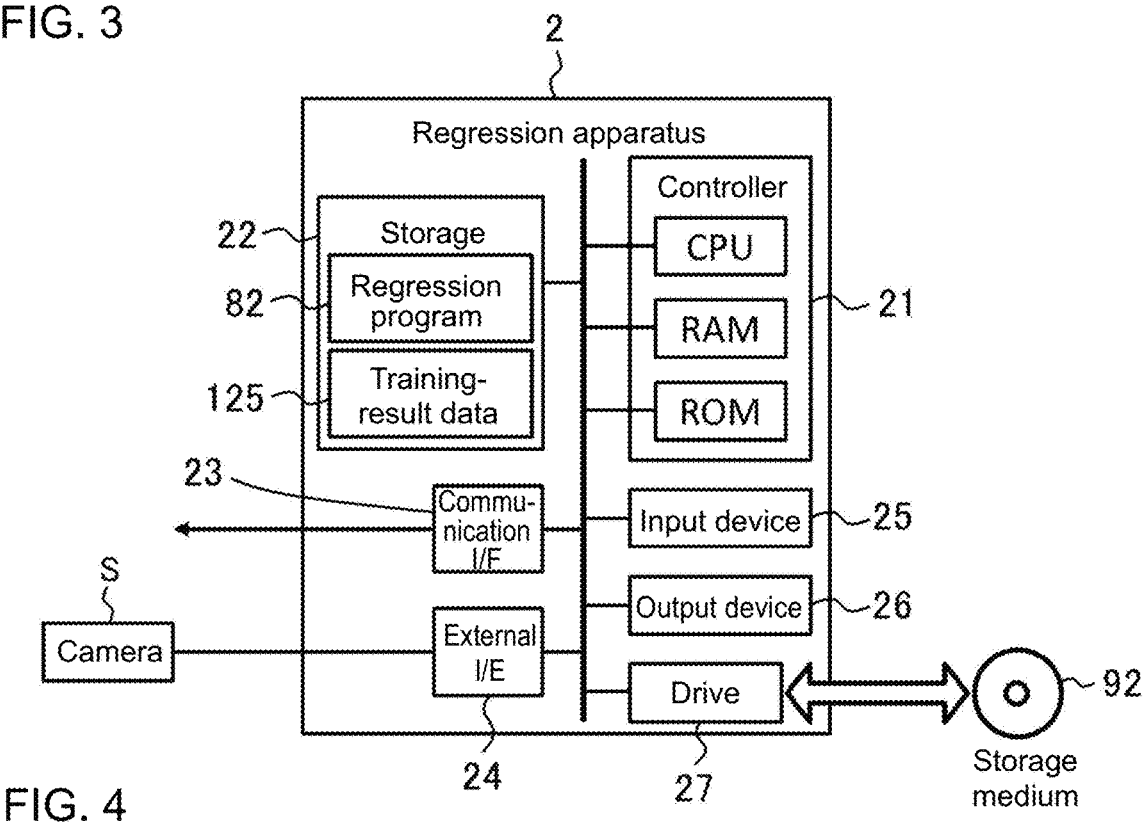
FIG. 3 is a schematic diagram illustrating a regression apparatus according to one or more embodiments showing an example hardware configuration.

FIG. 3 is a schematic diagram of the regression apparatus 2 according to the present embodiment showing its example hardware configuration. As shown in FIG. 3, the regression apparatus 2 according to the present embodiment is a computer including a controller 21, a storage 22, a communication interface 23, an external interface 24, an input device 25, an output device 26, and a drive 27 that are electrically connected to one another.

The components of the regression apparatus 2 from the controller 21 to the drive 27 and a storage medium 92 may have the same structures as the components of the above model generation apparatus 1 from the controller 11 to the drive 17 and the storage medium 91. The controller 21 includes, for example, a CPU as a hardware processor, a RAM, and a ROM, and performs various types of information processing operations based on programs and data. The storage 22 includes, for example, a hard disk drive or a solid-state drive. In the present embodiment, the storage 22 stores various items of information including a regression program 82 and the training-result data 125.

The regression program 82 causes the regression apparatus 2 to perform information processing (FIG. 7) for performing a regression task with the trained neural network module 5 (described later). The regression program 82 includes a series of commands for the information processing. At least one of the regression program 82 or the training-result data 125 may be stored in the storage medium 92. The regression apparatus 2 may obtain at least one of the regression program 82 or the training-result data 125 from the storage medium 92.

In the example of FIG. 3, the regression apparatus 2 is connected to the camera S (imaging device) with the external interface 24. The regression apparatus 2 can thus obtain one or more target images 221 from the camera S. The regression apparatus 2 may be connected to the camera S1 in any manner other than with the external interface 24. For a camera S including a communication interface, for example, the regression apparatus 2 may be connected to the camera S with the communication interface 23. The camera S may be of any type selected as appropriate in each embodiment. The camera S may be, for example, a common RGB camera, a stereo camera, a depth camera, or an infrared camera.

For the specific hardware configuration of the regression apparatus 2, components may be eliminated, replaced, or added as appropriate in each embodiment. For example, the controller 21 may include multiple hardware processors. Each hardware processor may be a microprocessor, an FPGA, a DSP, or other processors. The storage 22 may be the RAM and the ROM included in the controller 21. At least one of the communication interface 23, the external interface 24, the input device 25, the output device 26, or the drive 27 may be eliminated. The regression apparatus 2 may include multiple computers. In this case, each computer may have the same or a different hardware configuration. The regression apparatus 2 may be an information processing apparatus dedicated to a service to be provided, or may be a general-purpose server, a general-purpose PC, or a programmable logic controller (PLC).

Software Configuration

Model Generation Apparatus

Figure 4:
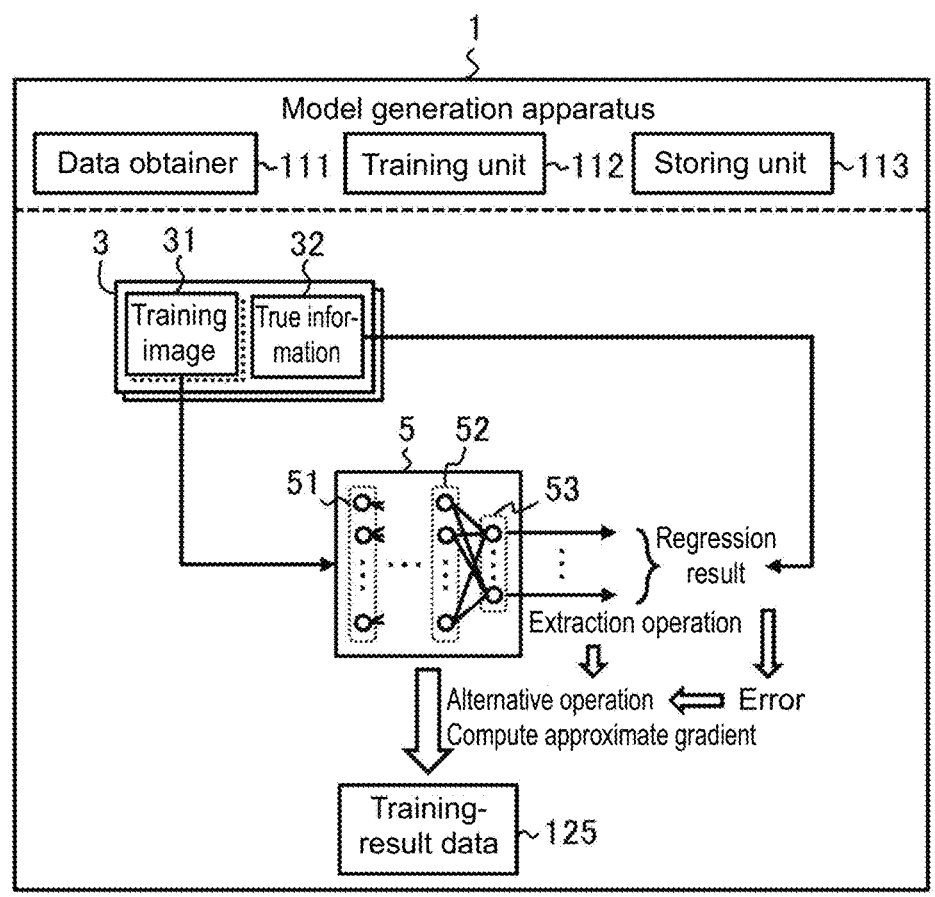
FIG. 4 is a schematic diagram illustrating a model generation apparatus according to one or more embodiments showing an example software configuration.

FIG. 4 is a schematic diagram of the model generation apparatus 1 according to the present embodiment showing its example software configuration. The controller 11 in the model generation apparatus 1 loads the model generation program 81 stored in the storage 12 into the RAM. The CPU in the controller 11 then interprets and executes the commands included in the model generation program 81 loaded in the RAM to control each component. The model generation apparatus 1 according to the present embodiment thus operates as a computer including a data obtainer 111, a training unit 112, and a storing unit 113 as software modules as shown in FIG. 4. In other words, in the present embodiment, each software module in the model generation apparatus 1 is implemented by the controller 11 (CPU).

The data obtainer 111 obtains multiple training data pairs 3. Each training data pair 3 includes a combination of one or more training images 31 and true information 32. The true information 32 indicates ground truth for a real number to be computed using regression from the corresponding one or more training images 31.

The training unit 112 trains the neural network module 5 through machine learning using the obtained multiple training data pairs 3. The neural network module 5 includes the operation to extract an element that satisfies a predetermined condition from a set of targets. The machine learning includes training the neural network module 5 on each training data pair 3 to compute, from the training images 31 using regression, a value that fits the ground truth indicated by the true information 32. The training unit 112 performs, during such machine learning, the extraction operation without any additional operation in the phase of forward propagation, but replaces, in the phase of backpropagation, the extraction operation with a differentiable alternative operation and differentiates the resulting alternative operation to compute an approximate gradient corresponding to differentiation for the extraction operation.

The storing unit 113 generates information about the trained neural network module 5 generated through machine learning as the training-result data 125, and stores the generated training-result data 125 into a predetermined storage area. The training-result data 125 may be generated as appropriate to include information for reproducing the trained neural network module 5.

Neural Network Module

As shown in FIG. 4, an example of the neural network module 5 in the present embodiment includes an input layer 51, one or more intermediate (hidden) layers 52, and an output layer 53. The number of intermediate layers 52 may be determined as appropriate in each embodiment. Each of the layers 51 to 53 includes one or more neurons (nodes). Each of the layers 51 to 53 may include any number of neurons determined as appropriate in each embodiment. In the present embodiment, the neurons included in each of the layers 51 to 53 are connected to all the neurons in the adjacent layers. The neural network module 5 in the present embodiment is thus a fully connected neural network.

Each of the layers 51 to 53 has a weight defined for each connection (connection weight). Each neuron has a preset threshold. An output of each neuron is basically determined depending on whether the sum of the product of each input and the corresponding weight exceeds the threshold. The threshold may be expressed using an activation function. In this case, the sum of the product of each input and the corresponding weight is input into the activation function, and the activation function is computed to determine the output of each neuron. The type of the activation function may be selected as appropriate. The extraction operation may be used as at least a part of the activation function or an operation for deriving a final regression result from the output value from the output layer 53. The connection weights between neurons included in each of the layers 51 to 53 and the threshold of each neuron are examples of the operation parameters.

In the above machine learning, the training unit 112 uses the training images 31 included in each training data pair 3 as training data (input data) and the true information 32 as ground truth data (a supervisory signal or a label). More specifically, the training unit 112 inputs the training images 31 included in each training data pair 3 into the input layer 51 and performs a forward propagation operation with the neural network module 5. The training unit 112 performs the extraction operation without any additional operation in this forward propagation operation process. The training unit 112 obtains, as a result of the forward propagation operation, a regression result of a real number for the training images 31. The training unit 112 computes an error between the obtained regression result and the ground truth indicated by the true information 32 associated with the input training images 31. The training unit 112 then computes the gradient of the error, and adjusts the value of each operation parameter by backpropagating the computed gradient of the error. In this backpropagation operation process, the training unit 112 uses the approximate gradient computed by differentiating the alternative operation as a result of differentiation for the extraction operation. The training unit 112 iterates, for each training data pair 3, the above series of processes for adjusting the value of each operation parameter to reduce the sum of the computed errors. Such machine learning generates the trained neural network module 5 capable of computing one or more real numbers using regression from one or more images.

The storing unit 113 generates the training-result data 125 used to reproduce the trained neural network module 5 generated through the above machine learning. The training-result data 125 may have any structure that allows reproduction of the trained neural network module 5. The structure may be determined as appropriate in each embodiment.

In one example, the training-result data 125 may include information indicating the values of the operation parameters obtained through adjustment in the above machine learning. In some embodiments, the training-result data 125 may further include information indicating the structure of the neural network module 5. The structure may be defined using, for example, the number of layers from an input layer to an output layer, the types of layers, the number of neurons included in each layer, and the connection relationship between neurons in adjacent layers. The storing unit 113 stores the generated training-result data 125 into a predetermined storage area.

Regression Apparatus

Figure 5:
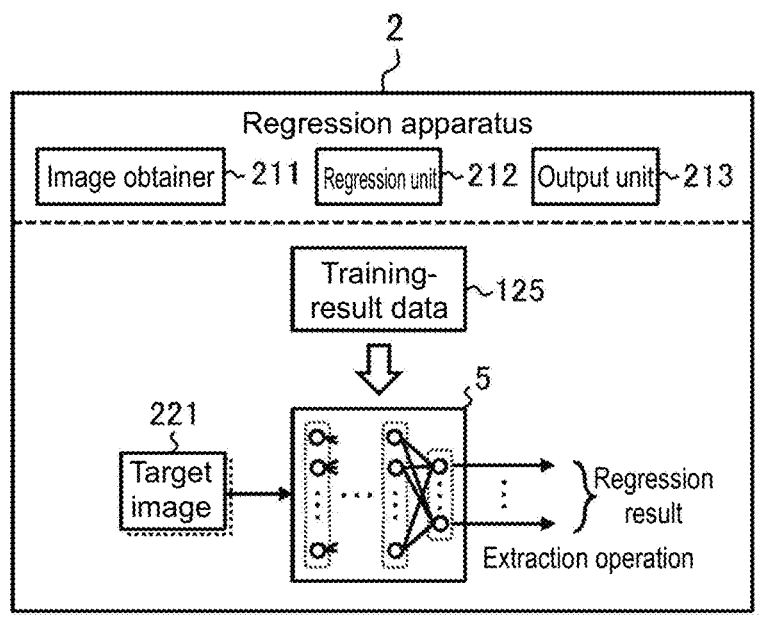
FIG. 5 is a schematic diagram illustrating a regression apparatus according to one or more embodiments showing an example software configuration.

FIG. 5 is a schematic diagram of the regression apparatus 2 according to the present embodiment showing its example software configuration. The controller 21 in the regression apparatus 2 loads the regression program 82 stored in the storage 22 into the RAM. The CPU in the controller 21 then interprets and executes the commands included in the regression program 82 loaded in the RAM to control each component. As shown in FIG. 5, the regression apparatus 2 according to the present embodiment thus operates as a computer including an image obtainer 211, a regression unit 212, and an output unit 213 as software modules. In other words, in the present embodiment, each software module in the regression apparatus 2 is implemented by the controller 21 (CPU) in the same manner as in the model generation apparatus 1.

The image obtainer 211 obtains one or more target images 221 to undergo a regression task. The regression unit 212 stores the training-result data 125 and thus includes the trained neural network module 5. The regression unit 212 computes a real number using regression from the obtained target images 221 with the trained neural network module 5. More specifically, the regression unit 212 inputs the obtained target images 221 into the input layer 51 of the trained neural network module 5 and performs a forward propagation operation with the trained neural network module 5, including the extraction operation. The regression unit 212 obtains, as a result of the forward propagation operation, a regression result of a real number for the target images 221. The output unit 213 outputs information about the obtained regression result.

Others

Each software module in the model generation apparatus 1 and the regression apparatus 2 will be described in detail in the operation examples below. In the present embodiment, each software module in the model generation apparatus 1 and the regression apparatus 2 is implemented by a general-purpose CPU. However, some or all of the software modules may be implemented by one or more dedicated processors (e.g., graphics processing units). Each of the modules may be implemented as a hardware module. For the software configurations of the model generation apparatus 1 and the regression apparatus 2, software modules may be eliminated, replaced, or added as appropriate in each embodiment.

3. Operation Examples

Model Generation Apparatus

Figure 6:
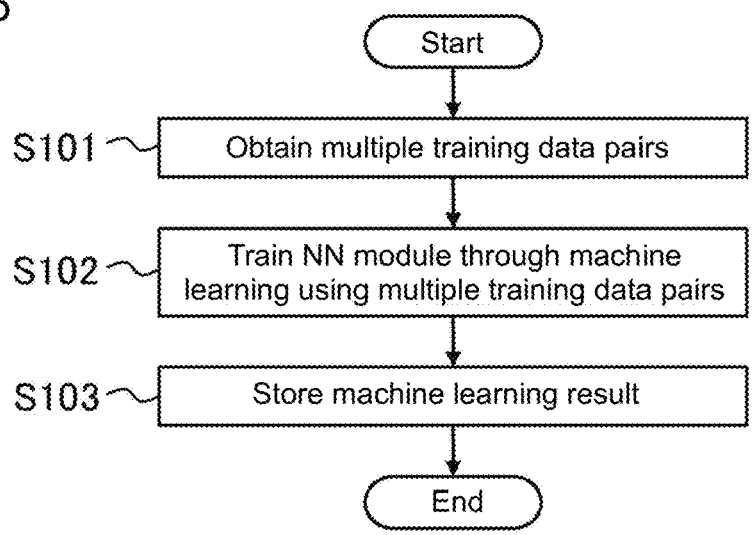
FIG. 6 is a flowchart illustrating an example procedure performed by the model generation apparatus according to one or more embodiments.

FIG. 6 is a flowchart of an example procedure for machine learning performed by the model generation apparatus 1 according to the present embodiment. The procedure performed by the model generation apparatus 1 described below is an example of a model generation method. The procedure performed by the model generation apparatus 1 described below is a mere example, and each of its steps may be modified in any possible manner. In the procedure below, steps may be eliminated, replaced, or added as appropriate in each embodiment.

Step S101

In step S101, the controller 11 operates as the data obtainer 111 and obtains multiple training data pairs 3.

Each training data pair 3 may be generated as appropriate. For example, the camera S or a camera of the same type as the camera S is prepared. A target used for a regression task to be learned through machine learning is imaged with the prepared camera. In this manner, one or more training images 31 corresponding to the regression task to be learned are generated. The generated training images 31 are associated with true information 32 indicating ground truth for the regression task. The true information 32 may be generated manually by an operator or at least partially automatically through image analysis or with an estimator such as another trained machine learning model. The true information 32 may be in any data format selected as appropriate for each regression task. In one example, for a regression task of computing disparities between multiple images pixel by pixel, the true information 32 may indicate ground truth for the disparity of each pixel as image data (e.g., FIG. 11C referred to later). In another example, for a regression task of computing a motion of an object in multiple images captured continuously, the true information 32 may indicate ground truth for an estimate (e.g., vector value) for the motion, such as a motion direction or speed, as numerical data. In still another example, for a regression task of detecting an object in an image, the true information 32 may indicate ground truth for an estimate for a detected position, such as the position or the size (range) of the object in the image, as numerical data. Each training data pair 3 can be generated through the above series of processes.

Each training data pair 3 may be automatically generated through a computer operation or at least partially manually generated through an operation performed by an operator. Each training data pair 3 may be generated by the model generation apparatus 1 or by a computer other than the model generation apparatus 1. When the model generation apparatus 1 generates each training data pair 3, the controller 11 may perform the generation process described above automatically or in response to a manual operation performed by an operator with the input device 15 to obtain the training data pair 3. When another computer generates each training data pair 3, the controller 11 may obtain the training data pair 3 generated by the other computer through, for example, a network or the storage medium 91. Some of the multiple training data pairs 3 may be generated by the model generation apparatus 1, and the remaining of the multiple training data pairs 3 may be generated by one or more other computers.

Any number of training data pairs 3 may be obtained. The number of training data pairs 3 to be obtained may be determined as appropriate to perform machine learning in each embodiment. After obtaining the multiple training data pairs 3, the controller 11 advances the processing to subsequent step S102.

Step S102

In step S102, the controller 11 operates as the training unit 112 and trains the neural network module 5 through machine learning using the obtained multiple training data pairs 3.

In an example process of the machine learning, the controller 11 first initializes the neural network module 5 to be trained through machine learning. The architecture of the neural network module 5 (e.g., the number of layers, the types of layers, the number of neurons in each layer, and the connection relationship between neurons in adjacent layers), the default values of the connection weights between neurons, and the default threshold of each neuron may be preset using a template or may be input by an operator. For relearning, the controller 11 may initialize the neural network module 5 based on the training-result data obtained through past machine learning.

The neural network module 5 may have any structure determined as appropriate in each embodiment to compute a real number using regression from an image. In one example, the neural network module 5 may further include an operation to compute the likelihood of each of multiple candidate values being a real number to be computed using regression. The candidate values may be provided as appropriate. In addition, the extraction operation may include extracting an element of a maximum (argmax operation) from the computed likelihoods. In this structure, a real number can be computed using regression from an expected value based on the likelihood of each candidate value. The likelihood of each candidate value may be expressed using a reciprocal. For the likelihood expressed using a reciprocal, extracting an element of a maximum from the likelihoods may include extracting an element of a minimum (argmin operation). A reciprocal of the likelihood is hereafter also referred to as a cost. The operation to compute each likelihood may be included in the operation performed in the output layer 53. In this case, the output value from the output layer 53 may include the likelihood (or its reciprocal) of each candidate value.

In a specific example of this structure, the output layer 53 may output a cost $x_i$ (reciprocal of the likelihood) of each candidate value i. A set of candidate values i may be set as appropriate, but is hereafter denoted with 0, 1, . . . , and D−1 (in other words, the number of candidate values is D) for ease of explanation. In one example, to estimate the disparity of each pixel in an image with a size of W×H (the number of real numbers to be computed using regression is W×H), the output layer 53 may output W×H×D costs $x_i$. In another example, to estimate two-dimensional motions (two-dimensional vectors) of N objects in consecutive images, the output layer 53 may output 2×N×D costs $x_i$. In still another example, to estimate the two-dimensional coordinates of any points included in M objects in an image and the sizes (length in each direction) of the objects (in other words, to detect objects in a rectangular range), the output layer 53 may output 4×M×D costs $x_i$. In this case, the final regression result may be computed by performing operations written as Formulas 1 to 5 below for each real number to be computed using regression.

$$h(x) = \sum_{i=0}^{D-1} d_i \sigma_i(x) \quad (1)$$

$$\sigma_i(x) = 1 \text{ if } i = \operatorname{argmin}_j\{x_j\} \text{ and } 0 \text{ otherwise} \quad (2)$$

$$m_i(x, w) = \exp\left(-\left(\frac{h(x) - d_i}{\frac{w}{2}}\right)^2\right) \quad (3)$$

$$\sigma_i^w(x) = \frac{m_i(x, w)e^{-x_i}}{Z} \quad (4)$$

$$d_{semi-soft} = \sum_{i=0}^{D-1} d_i \sigma_i^w(x) \quad (5)$$

In the formulas, $\sigma_i(x)$ is an operation (argmin operation) to extract an element of a minimum from all the costs and is an example of the extraction operation. In the above series of operation processes, candidate values with a minimum cost (the highest likelihood) are first obtained by performing the operations written as Formulas 1 and 2. A window with the obtained candidate values at a center is then created by performing the operations written as Formulas 3 and 4, where w is a parameter that defines the size of a window function (e.g., the size of variance in a Gaussian function) and may be determined as appropriate for each task, and Z is a normalized constant. In Formulas 3 and 4, a Gaussian function is used to create the window. The window function may be of any other type selected as appropriate in each embodiment. An expected value ($d_{semi\text{-}soft}$) is computed by performing the operation written as Formula 5 using the created window. The computed expected value is obtained as a final regression result. The neural network module 5 in the present embodiment may yield the final regression result from the output value from the output layer 53 by performing the series of operations written as Formulas 1 to 5 above.

The controller 11 then trains the neural network module 5 on each training data pair 3 to compute, from the training images 31 using regression, a value that fits the ground truth indicated by the true information 32. The training process may include, for example, stochastic gradient descent and mini-batch gradient descent.

In an example of the training process, the controller 11 first inputs the training images 31 included in each training data pair 3 into the input layer 51 and performs a forward propagation operation. The controller 11 obtains, as a result of the forward propagation operation, a regression result of a real number for the training images 31. In the above example, the controller 11 performs a forward propagation operation through each of the layers 51 to 53 to obtain the costs $x_i$ of candidate values for a real number to be computed using regression from the output layer 53. The controller 11 then performs the operations written as Formulas 1 to 5 above using the obtained costs $x_i$ of the candidate values to obtain the regression result. The controller 11 performs the extraction operation (Formula 2 in the above example) without any additional operation in this forward propagation operation process.

The controller 11 then computes an error between the obtained regression result and the ground truth indicated by the corresponding true information 32. The error (loss) may be computed with a loss function. The loss function used for computing such an error may be of any type selected as appropriate in each embodiment. Subsequently, the controller 11 computes the gradient of the computed error. The controller 11 uses backpropagation to compute an error in the value of each operation parameter from the layer on the output end using the computed gradient of the error.

In this operation process for backpropagating the error, the controller 11 replaces the extraction operation with a differentiable alternative operation and differentiates the resulting alternative operation to compute an approximate gradient corresponding to differentiation for the extraction operation. In the above example, the extraction operation $\sigma_i(x)$ in Formula 2 may be replaced by the alternative operation $\sigma_i^a(x)$ in Formula 6 below.

$$\sigma_i^a(x) = \frac{e^{-x_i}}{\sum_{k=0}^{D-1} e^{-x_k}} \quad (6)$$

In this example, the controller 11 first differentiates the term $\sigma_i^w(x)$ in Formula 5. The controller 11 then differentiates the term $h(x)$ in Formula 3. The controller 11 then differentiates the resulting alternative operation $\sigma_i^a(x)$. The controller 11 uses the approximate gradient computed by differentiating the alternative operation $\sigma_i^a(x)$ as a gradient (as a result of differentiation) of the extraction operation $\sigma_i(x)$. In this example, after computing the approximate gradient, the controller 11 backpropagates the computed approximate gradient from the output layer 53 to the input layer 51 to compute an error in the value of each operation parameter for each of the layers 51 to 53.

The controller 11 then updates the value of each operation parameter for each of the layers 51 to 53 based on the computed error. The values of the operation parameters may be updated by the frequency adjusted based on the learning rate. The learning rate may be provided with an indication by an operator or provided as a value preset in a program.

The controller 11 adjusts, for each training data pair 3, the value of each operation parameter for each of the layers 51 to 53 with the above series of updating processes to reduce the sum of the computed errors. For example, until the predetermined condition is satisfied, such as an operation being performed a predetermined number of times or the sum of computed errors falling below a threshold, the controller 11 may iteratively adjust the value of each operation parameter with the above series of updating processes.

The controller 11 can generate, through the machine learning, the trained neural network module 5 capable of performing an intended regression task corresponding to the used training data pairs 3. After the machine learning process, the controller 11 advances the processing to subsequent step S103.

Step S103

In step S103, the controller 11 operates as the storing unit 113 and generates information about the trained neural network module 5 generated through machine learning as the training-result data 125. The controller 11 then stores the generated training-result data 125 into a predetermined storage area.

The predetermined storage area may be, for example, the RAM in the controller 11, the storage 12, an external storage, a storage medium, or a combination of these. The storage medium is, for example, a CD or a DVD. The controller 11 may store the training-result data 125 into the storage medium through the drive 17. The external storage may be, for example, a data server, such as a network attached storage (NAS). In this case, the controller 11 may use the communication interface 13 to store the training-result data 125 into the data server through a network. The external storage may be connected to the model generation apparatus 1 with the external interface 14.

After storing the training-result data 125, the controller 11 ends the procedure performed by the model generation apparatus 1 in the present operation example.

The generated training-result data 125 may be provided to the regression apparatus 2 at any selected time. For example, the controller 11 may transfer the training-result data 125 to the regression apparatus 2 in step S103 or in a step separate from step S103. The regression apparatus 2 may receive the transferred data to obtain the training-result data 125. In another example, the regression apparatus 2 may use the communication interface 23 to access the model generation apparatus 1 or the data server through a network and obtain the training-result data 125. In still another example, the regression apparatus 2 may obtain the training-result data 125 through the storage medium 92. In still another example, the regression apparatus 2 may prestore the training-result data 125.

The controller 11 may further update or newly generate the training-result data 125 by regularly or irregularly iterating the processing in steps S101 to S103 above. During the iterated processing, at least parts of the training data pairs 3 used for the machine learning may undergo, for example, changes, modifications, additions, and deletions as appropriate. The controller 11 may provide the updated or newly generated training-result data 125 to the regression apparatus 2 in any manner to update the training-result data 125 stored by the regression apparatus 2.

Regression Apparatus

Figure 7:
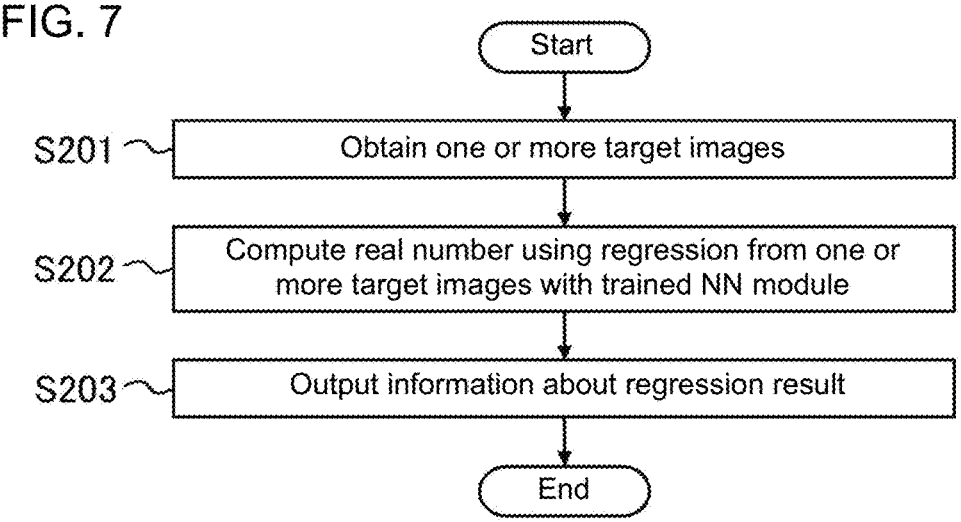
FIG. 7 is a flowchart illustrating an example procedure performed by the regression apparatus according to one or more embodiments.

FIG. 7 is a flowchart of an example procedure for a regression task performed by the regression apparatus 2 according to the present embodiment. The procedure performed by the regression apparatus 2 described below is an example of a regression method. The procedure performed by the regression apparatus 2 described below is a mere example, and each of its steps may be modified in any possible manner. In the procedure below, steps may be eliminated, replaced, or added as appropriate in each embodiment.

Step S201

In step S201, the controller 21 operates as the image obtainer 211 and obtains one or more target images 221 to undergo a regression task. In the present embodiment, the controller 21 directly obtains the target images 221 from the camera S through the external interface 24. The target images 221 may be moving images or still images. The target images 221 may be obtained through any other path. For example, the camera S may be connected to another computer. In this case, the controller 21 may indirectly obtain the target images 221 from the camera S through the other computer. After obtaining the target images 221, the controller 21 advances the processing to subsequent step S202.

Step S202

In step S202, the controller 21 operates as the regression unit 212, and refers to the training-result data 125 and defines the trained neural network module 5. The controller 21 then computes a real number using regression from the obtained target images 221 with the trained neural network module 5.

The operation process for regression may be the same as the operation process performed in the phase of trial regression in the training process of the machine learning described above. More specifically, the controller 21 inputs the obtained target images 221 into the input layer 51 of the trained neural network module 5 and performs a forward propagation operation including the extraction operation (Formula 2 in the above example). The controller 21 obtains, as a result of the forward propagation operation, a regression result of a real number for the target images 221. In the above example, the controller 21 inputs the obtained target images 221 into the input layer 51 and performs a forward propagation operation through each of the layers 51 to 53 to obtain the costs $x_i$ of candidate values for a real number from the output layer 53. The controller 21 then performs the operations written as Formulas 1 to 5 above using the obtained costs $x_i$ of the candidate values to obtain the regression result.

After obtaining the regression result of the real number for the target images 221 from the trained neural network module 5, the controller 21 advances the processing to subsequent step S203.

Step S203

In step S203, the controller 21 operates as the output unit 213 and outputs information about the regression result.

The destination and the details of the output information may be determined as appropriate in each embodiment. For example, the controller 21 may output the regression result obtained in step S202 to the output device 26 without further processing. The controller 21 may perform information processing based on the obtained regression result. The controller 21 may then output the processed information as information about the regression result. The processed information being output may include, for example, the operation of a control target device being controlled in accordance with the regression result. The information may be output to, for example, the output device 26, an output device included in another computer, or the control target device.

After outputting the information about the regression result, the controller 21 ends the procedure performed by the regression apparatus 2 in the present operation example. The controller 21 may continuously iterate the series of information processing in steps S201 to S203. The processing may be iterated at any time determined as appropriate in each embodiment. The regression apparatus 2 may thus continuously and iteratively perform the above regression task.

Features

As described above, in the phase of backpropagation in machine learning in step S102, the model generation apparatus 1 according to the present embodiment replaces the extraction operation included in the neural network module 5 with a differentiable alternative operation and uses the approximate gradient computed by differentiating the alternative operation as a gradient of the extraction operation. This replacement allows the neural network module 5 including the non-differentiable extraction operation to be trained through machine learning appropriately. The regression apparatus 2 according to the present embodiment uses the trained neural network module 5 generated through such machine learning in the regression process in step S202. The regression apparatus 2 performs the extraction operation in the regression operation process with the trained neural network module 5 to allow the computation to be less susceptible to candidates other than the most promising candidate. In the above example, the range in which the expected value is computed can be narrowed to the neighborhood of a candidate value with the highest likelihood by performing the operations written as Formulas 1 to 4 (in other words, the computation is less susceptible to candidate values away from the candidate value with the highest likelihood). This can improve the accuracy of regression in step S202.

4. Modifications

The embodiment of the present invention described in detail above is a mere example of the present invention in all respects. The embodiment may be variously modified or altered without departing from the scope of the present invention. For example, the embodiment may be modified in the forms described below. In the modifications described below, the same reference numerals denote the same components in the above embodiment, and the operations and the components that are the same as those in the above embodiment will not be described. The modifications described below may be combined as appropriate.

4.1

The regression system 100 according to the above embodiment may be used in any situation in which one or more real numbers are computed from one or more images using regression. The regression system 100 according to the above embodiment may be used in specific situations in which, for example, disparities between multiple images are measured, a motion across multiple consecutive images is measured, or an object is detected in an image. Such specific situations will be described below.

(A) Measuring Disparity

Figure 8:
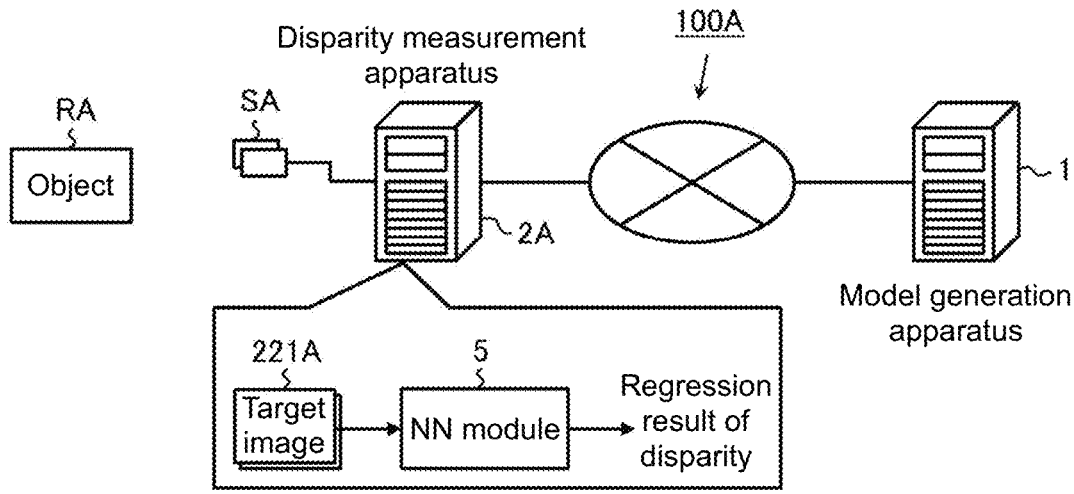
FIG. 8 is a schematic diagram illustrating another example situation in one or more embodiments.

FIG. 8 is a schematic diagram of a first specific example situation in which a disparity measurement system 100A is used. In the first specific situation, the structure in the above embodiment is used to measure disparities between multiple images. The disparity measurement system 100A in the first specific situation includes the model generation apparatus 1 and a disparity measurement apparatus 2A. The disparity measurement apparatus 2A is an example of the above regression apparatus 2.

One or more images (training images or target images) in the first specific situation include multiple images (typically, two images) captured at the same time with multiple cameras at different positions. The real numbers to be computed using regression are disparities between the multiple images. The multiple images are captured with an imaging device SA including multiple cameras, such as a stereo camera. The multiple cameras may be installed independently of one another or may be installed in a single unit, such as a stereo camera or a smartphone. Except these, the structure in the first specific situation may be the same as in the above embodiment. The disparities may be typically computed pixel by pixel using regression. However, the disparities may be computed using regression in any other unit determined as appropriate in each embodiment.

Model Generation Apparatus

In the first specific situation, the model generation apparatus 1 can generate a trained neural network module 5 capable of computing disparities between multiple images using regression with the same procedure as in the above embodiment.

More specifically, in step S101, the controller 11 obtains multiple training data pairs. Each training data pair includes a combination of multiple training images and true information. The multiple training images may be obtained by capturing images of a single target at the same time at different positions. The true information indicates ground truth for the disparities between the multiple images. Each training data pair may typically include a combination of two training images having a disparity between them and true information indicating, for each pixel, ground truth for the disparity in one of the images with respect to the other image.

In step S102, the controller 11 trains the neural network module 5 through machine learning using the obtained multiple training data pairs. In the same manner as in the above embodiment, in the phase of backpropagation in the machine learning, the controller 11 uses the approximate gradient computed by differentiating the alternative operation as a result of differentiation for the extraction operation. Such machine learning generates the trained neural network module 5 capable of computing disparities between multiple images using regression. In step S103, the controller 11 stores training-result data indicating the generated trained neural network module 5 into a predetermined storage area. The training-result data may be provided to the disparity measurement apparatus 2A at any selected time.

Disparity Measurement Apparatus

The disparity measurement apparatus 2A may have the same hardware and software configurations as the regression apparatus 2 according to the above embodiment. In the first specific situation, the disparity measurement apparatus 2A can measure disparities between multiple images with the same procedure as the above regression apparatus 2.

More specifically, in step S201, a controller in the disparity measurement apparatus 2A operates as an image obtainer and obtains multiple target images 221A. The disparity measurement apparatus 2A may include the imaging device SA including the multiple cameras at different positions. The controller may obtain the multiple target images 221A from the imaging device SA. The multiple target images 221A may be generated by capturing images of a single target (object RA in the example of FIG. 8) at the same time with the multiple cameras at the different positions. The controller may typically obtain two target images 221A.

In step S202, the controller operates as a regression unit and computes the disparity between the obtained multiple target images 221A using regression with the trained neural network module 5. More specifically, the controller inputs the obtained multiple target images 221A into the input layer 51 of the trained neural network module 5 and performs a forward propagation operation including the extraction operation. The controller can obtain, as a result of the forward propagation operation, a regression result of the disparities between the multiple target images 221A.

In step S203, the controller operates as an output unit and outputs information about the regression result of the disparities. In one example, the controller may output the obtained disparities without further processing. In another example, the controller may compute the distance to the object RA in the multiple target images 221A based on the obtained disparities. In this case, the controller may output the computed distance. The controller may perform information processing based on the computed distance.

In a specific situation, disparities between multiple images may be measured for, for example, monitoring the surroundings of a vehicle, image measurement in, for example, factory automation (FA), and robot vision. When disparities are measured for monitoring the surroundings of a vehicle, the object RA may be an obstacle (e.g., a person or an object). In this case, the controller may compute the distance to the obstacle based on the obtained disparities. The controller may determine whether the obstacle is within a predetermined range in a traveling direction of the vehicle based on the computed distance to the obstacle. Upon determining that the obstacle is within the predetermined range in the traveling direction of the vehicle, the controller may output a command to the vehicle to stop or decelerate.

To measure disparities for image measurement, the controller may estimate the position and the shape of the object RA based on the obtained disparities. In a specific situation, the disparity measurement apparatus 2A may operate as an inspection apparatus that measures the state of solder applied to a terminal on a substrate, and the object RA may be the solder. In this case, the controller may compute the shape (specifically, the shape in a height direction) of the solder applied to the terminal based on the obtained disparities and determine whether a sufficient amount of solder is applied based on the computed shape of the solder.

To measure disparities in robot vision, the controller may compute the distance to the object RA based on the obtained disparities. The controller may then control the motion of a robotic device (e.g., a motion of gripping the object RA with a robot hand) based on the computed distance.

Features

The model generation apparatus 1 in the first specific situation can appropriately generate the trained neural network module 5 that includes the extraction operation and is capable of computing disparities between multiple images using regression. The disparity measurement apparatus 2A performs the extraction operation in the regression operation process with the trained neural network module 5, thus accurately measuring the disparities between the multiple target images 221A.

(B) Measuring Motion

Figure 9:
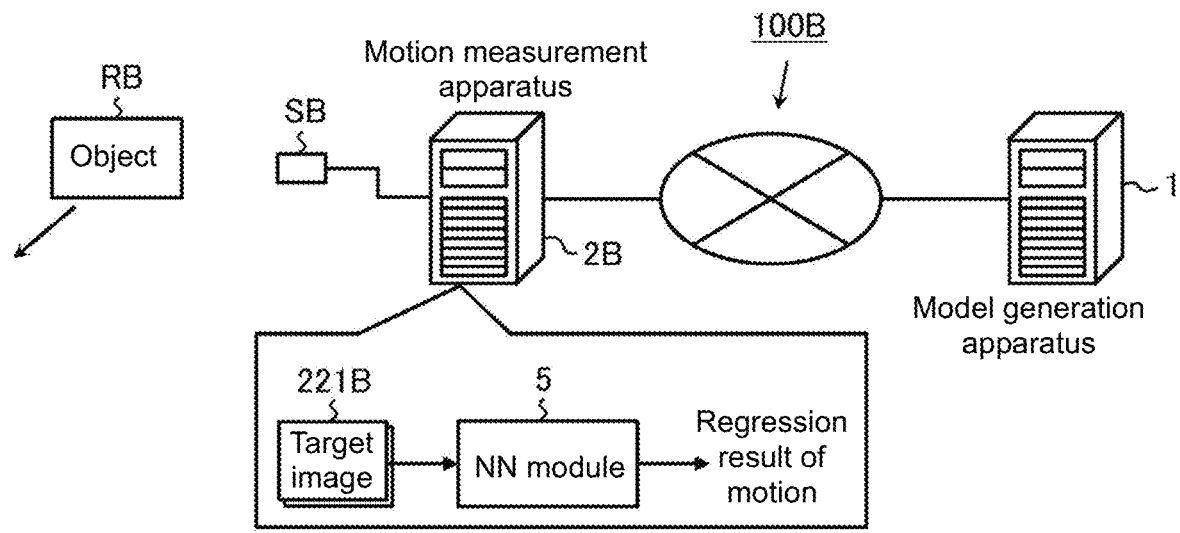
FIG. 9 is a schematic diagram illustrating still another example situation in one or more embodiments.

FIG. 9 is a schematic diagram of a second specific example situation in which a motion measurement system 100B is used. In the second specific situation, the structure in the above embodiment is used to measure a motion of an object in multiple images captured continuously. The motion measurement system 100B in the second specific situation includes the model generation apparatus 1 and a motion measurement apparatus 2B. The motion measurement apparatus 2B is an example of the above regression apparatus 2.

One or more images (training images or target images) in the second specific situation include multiple images (typically, two images adjacent to each other in time series) captured with a camera SB continuously. The real number to be computed using regression is an estimate for a motion of an object RB in the multiple images. The estimate for the motion may be, for example, the amount of displacement in the direction of each coordinate axis in the image space or the amount of change (the displacement angle and the magnitude of displacement) on the polar coordinates. The estimate may be computed pixel by pixel using regression. The camera SB continuously captures images in time series. The camera SB may be, for example, a video camera. Except these, the structure in the second specific situation may be the same as in the above embodiment.

Model Generation Apparatus

In the second specific situation, the model generation apparatus 1 can generate a trained neural network module 5 capable of computing a motion of an object in multiple consecutive images using regression with the same procedure as in the above embodiment.

More specifically, in step S101, the controller 11 obtains multiple training data pairs. Each training data pair includes a combination of multiple training images and true information. The multiple training images may be obtained by continuously capturing images of an object in time series. The true information indicates ground truth for the motion of the object in the multiple training images. Each training data pair may typically include a combination of two training images captured at different times and true information indicating ground truth for the motion of the object across the preceding training image to the latter training image.

In step S102, the controller 11 trains the neural network module 5 through machine learning using the obtained multiple training data pairs. In the same manner as in the above embodiment, in the phase of backpropagation in the machine learning, the controller 11 uses the approximate gradient computed by differentiating the alternative operation as a result of differentiation for the extraction operation. Such machine learning generates the trained neural network module 5 capable of computing a motion of an object in multiple consecutive images using regression. In step S103, the controller 11 stores training-result data indicating the generated trained neural network module 5 into a predetermined storage area. The training-result data may be provided to the motion measurement apparatus 2B at any selected time.

Motion Measurement Apparatus

The motion measurement apparatus 2B may have the same hardware and software configurations as the regression apparatus 2 according to the above embodiment. In the second specific situation, the motion measurement apparatus 2B can measure a motion of an object in multiple consecutive images with the same procedure as the above regression apparatus 2.

More specifically, in step S201, a controller in the motion measurement apparatus 2B operates as an image obtainer and obtains multiple consecutive target images 221B in time series. The motion measurement apparatus 2B may include the camera SB (imaging device). The controller may obtain the multiple consecutive target images 221B from the camera SB. The controller may typically obtain two target images 221B captured at different times.

In step S202, the controller operates as a regression unit and computes a motion of the object RB in the obtained multiple target images 221B using regression with the trained neural network module 5. More specifically, the controller inputs the obtained multiple target images 221B into the input layer 51 of the trained neural network module 5 and performs a forward propagation operation including the extraction operation. The controller can obtain, as a result of the forward propagation operation, a regression result of the motion of the object RB.

In step S203, the controller operates as an output unit and outputs information about the regression result of the motion of the object RB. In one example, the controller may output the obtained estimate for the motion without further processing. In another example, the controller may perform information processing based on the obtained estimate for the motion.

In a specific situation, a motion of the object RB may be measured for, for example, monitoring the surroundings of a vehicle, monitoring the motion of a person at any place, monitoring the motion of a vehicle traveling on a road, and providing guidance on a motion in a predetermined exercise to a person. When the motion measurement apparatus 2B is used to monitor the motion of a person at any place (in other words, the object RB is a person at any place), the controller may determine, for example, whether the person attempts to enter a dangerous area such as a railway track based on the estimate for the motion of the person obtained through the processing in step S202. Upon determining that the person attempts to enter the dangerous area, the controller may output a warning indicating that the person attempts to enter the area to a terminal carried by a user (e.g., a station employee or a security officer) around the area.

When the motion measurement apparatus 2B is used to provide guidance on a motion in a predetermined exercise to a person, the controller may compute the difference between the estimate for the motion of a user obtained through regression and a ground truth value for the proper motion and determine whether the user is performing the motion properly based on the computed difference. The controller may also determine a guidance message to reduce the computed difference and output the determined guidance message to the user. In this case, the motion measurement apparatus 2B may, for example, obtain the multiple target images 221B from a user terminal such as a smartphone and transmit the guidance message obtained through the processing described above to the user terminal. The motion in a predetermined exercise may be a motion in a sport such as golf, tennis, baseball, or soccer. When the motion measurement apparatus 2B is used to train a person with a lower motor function to recover the function as a part of nursing care, the motion in a predetermined exercise may be a motion associated with recovering of the function, such as standing up, walking, lifting an object, raising and lowering a leg, and pushing a pedal.

Features

The model generation apparatus 1 in the second specific situation can appropriately generate the trained neural network module 5 that includes the extraction operation and is capable of computing a motion of an object in multiple consecutive images using regression. The motion measurement apparatus 2B performs the extraction operation in the regression operation process with the trained neural network module 5, thus accurately measuring the motion of the object RB in the multiple consecutive target images 221B.

(C) Detecting Object

Figure 10:
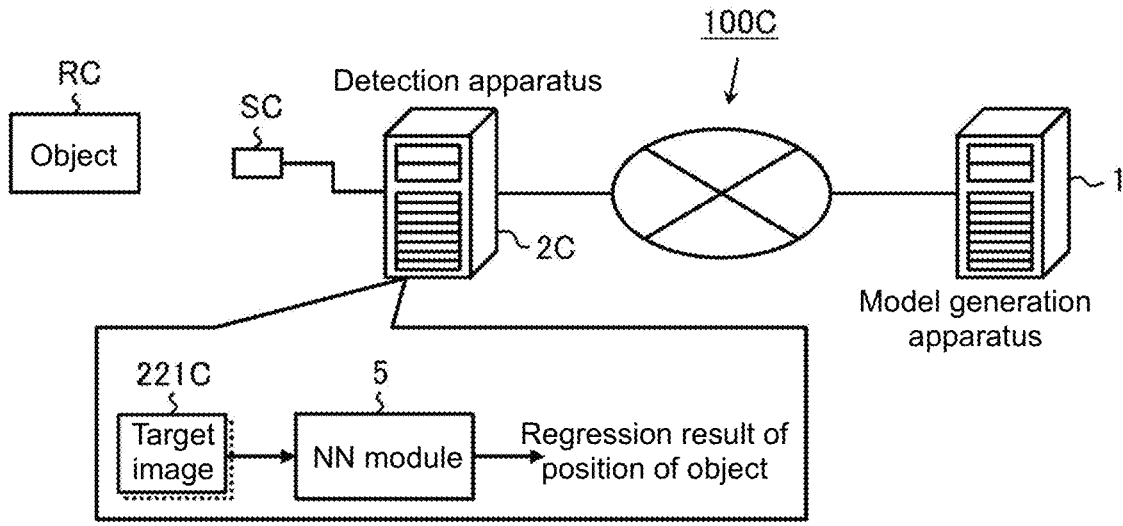
FIG. 10 is a schematic diagram illustrating still another example situation in one or more embodiments.

FIG. 10 is a schematic diagram of a third specific example situation in which a detection system 100C is used. In the third specific situation, the structure in the above embodiment is used to detect an object in an image. The detection system 100C in the third specific situation includes the model generation apparatus 1 and a detection apparatus 2C. The detection apparatus 2C is an example of the above regression apparatus 2.

In the third specific situation, an image of an object (typically, one image) is used as one or more images (training images or target images). The real number to be computed using regression is an estimate for a detected position of the object in the image. The estimate for the detected position may include, for example, the coordinates of any point included in the object in the image or dimensions (lengths in, for example, a width direction and a height direction). Except these, the structure in the third specific situation may be the same as in the above embodiment.

Model Generation Apparatus

In the third specific situation, the model generation apparatus 1 can generate a trained neural network module 5 capable of computing the position of an object in an image using regression with the same procedure as in the above embodiment.

More specifically, in step S101, the controller 11 obtains multiple training data pairs. Each training data pair includes a combination of a training image and true information. The training image may be obtained by capturing an image of an object RC with a camera SC or a camera of the same type. The camera SC may be of any type selected as appropriate in each embodiment. The camera SC may be, for example, a common RGB camera, a stereo camera, a depth camera, or an infrared camera. The object RC may be selected as appropriate for an expected situation in which the detection apparatus 2C is used. The true information indicates ground truth for the detected position of the object RC in the training image. Each training data pair may typically include a combination of one training image and true information indicating ground truth for a regression task of computing the detected position in the training image.

In step S102, the controller 11 trains the neural network module 5 through machine learning using the obtained multiple training data pairs. In the same manner as in the above embodiment, in the phase of backpropagation in the machine learning, the controller 11 uses the approximate gradient computed by differentiating the alternative operation as a result of differentiation for the extraction operation. Such machine learning generates the trained neural network module 5 capable of computing the position of an object in an image using regression. In step S103, the controller 11 stores training-result data indicating the generated trained neural network module 5 into a predetermined storage area.

The training-result data may be provided to the detection apparatus 2C at any selected time.

Detection Apparatus

The detection apparatus 2C may have the same hardware and software configurations as the regression apparatus 2 according to the above embodiment. In the third specific situation, the detection apparatus 2C can detect the object RC in an image with the same procedure as the above regression apparatus 2.

More specifically, in step S201, a controller in the detection apparatus 2C operates as an image obtainer and obtains a target image 221C. The detection apparatus 2C may include the camera SC (imaging device). The controller may obtain the target image 221C that can include the object RC from the camera SC. The controller may typically obtain one target image 221C.

In step S202, the controller operates as a regression unit and computes the detected position of the object RC using regression from the obtained target image 221C with the trained neural network module 5. More specifically, the controller inputs the obtained target image 221C into the input layer 51 of the trained neural network module 5 and performs a forward propagation operation including the extraction operation. The controller can obtain, as a result of the forward propagation operation, a regression result of the detected position of the object RC.

In step S203, the controller operates as an output unit and outputs information about the regression result of the detected position of the object RC. In one example, the controller may output the obtained estimate for the detected position without further processing. In another example, the controller may perform information processing based on the obtained estimate for the detected position.

In a specific situation, the object RC may be detected for, for example, monitoring the surroundings of a vehicle, monitoring a driver, monitoring a person at any place, and visual inspection (defect detection) of products. When the detection apparatus 2C is used to perform visual inspection of products (in other words, the object RC is a defect in a product), the controller may determine whether a product has a defect based on the estimate for the detected position of the defect obtained through the processing in step S202. Upon determining that the product has a defect, the controller may output a warning to indicate that the product has a defect. When the detection apparatus 2C is connected to a conveyor for conveying products, the controller may control the conveyor to separately convey defective products and defect-free products in different lines based on the result of determination as to whether any defect is detected.

Features

The model generation apparatus 1 in the third specific situation can generate the trained neural network module 5 that includes the extraction operation and is capable of computing the position of the object RC in an image using regression. The detection apparatus 2C performs the extraction operation in the regression operation process with the trained neural network module 5, thus accurately computing the position of the object RC in the target image 221C using regression.

4.2

The structure of the neural network module 5 is not limited to the structure in the above embodiment, and may be changed as appropriate in each embodiment. For example, each neuron may be connected to a particular neuron in an adjacent layer or to a neuron in a layer other than an adjacent layer. The neurons may be connected in any manner determined as appropriate in each embodiment. The intermediate layers 52 may be eliminated. The neural network module 5 may include other layers such as convolutional layers, pooling layers, normalized layers, and dropout layers. The neural network module 5 may be another neural network such as a convolutional neural network or a recurrent neural network.

In another example, the neural network module 5 that receives multiple input images may include multiple feature extractors and a combiner. Each feature extractor may be included for each input image on the input end and generate a feature map from the input image through one or more layers (e.g., convolutional layers and fully-connected layers). The combiner may be located on the output end to receive an output from each feature extractor and combine the feature maps obtained by the feature extractors through the layers.

In the above embodiment, the input to and the output from the neural network module 5 may be in any format determined as appropriate in each embodiment. For example, the neural network module 5 may further receive an input of information other than images. For example, the neural network module 5 may output information other than a regression result of a real number (e.g., an identification result of the object RC in the above third specific situation).

5. Experimental Example

To verify the effectiveness of the extraction operation, trained neural network modules in a working example and in a comparative example below were generated. The present invention is not limited to the working example described below.

First, the trained neural network module in the working example capable of computing, for each pixel, the disparity between two images using regression (in other words, computing the disparity of each pixel in one of the images with respect to the other image using regression) was generated with the same method as described in the above embodiment (first specific situation). The neural network module has the same structure as Table 1 in Non-Patent Literature 1 except the output layer. The output layer was designed to output the cost of a candidate value for the disparity of each pixel. The neural network module was designed to perform the operations written as Formulas 1 to 5 using an output value from the output layer (D=192, w=96). For training data pairs (training images and true information), the SceneFlow dataset (the training data includes 35,454 stereo image pairs) published in a reference (Nikolaus Mayer; Eddy Ilg; Philip Häusser; Philipp Fischer; Daniel Cremers; Alexey Dosovitskiy; Thomas Brox, A Large Dataset to Train Convolutional Networks for Disparity, Optical Flow, and Scene Flow Estimation. IEEE Conference on Computer Vision and Pattern Recognition 2016, https://arxiv.org/abs/1512.02134) was used. The trained neural network module in the comparative example was generated under the same conditions as in the working example except that the operations written as Formulas 1 to 5 were replaced by an operation written as Formula 7 below and the replacement in the phase of backpropagation was eliminated (the operation written as Formula 7 includes no extraction operation).

$$d_{soft} = \sum_{i=0}^{D-1} d_i \sigma_i^c(x), \quad \sigma_i^c(x) = \frac{e^{-x_i}}{\sum_{k=0}^{D-1} e^{-x_k}} \quad (7)$$

With the trained neural network module in the working example, an expected value ($d_{semi-soft}$) for each pixel computed using Formula 5 was obtained as a regression result of the disparity. With the trained neural network module in the comparative example, an expected value ($d_{soft}$) for each pixel computed using Formula 7 above was obtained as a regression result of the disparity.

Figure 11A:
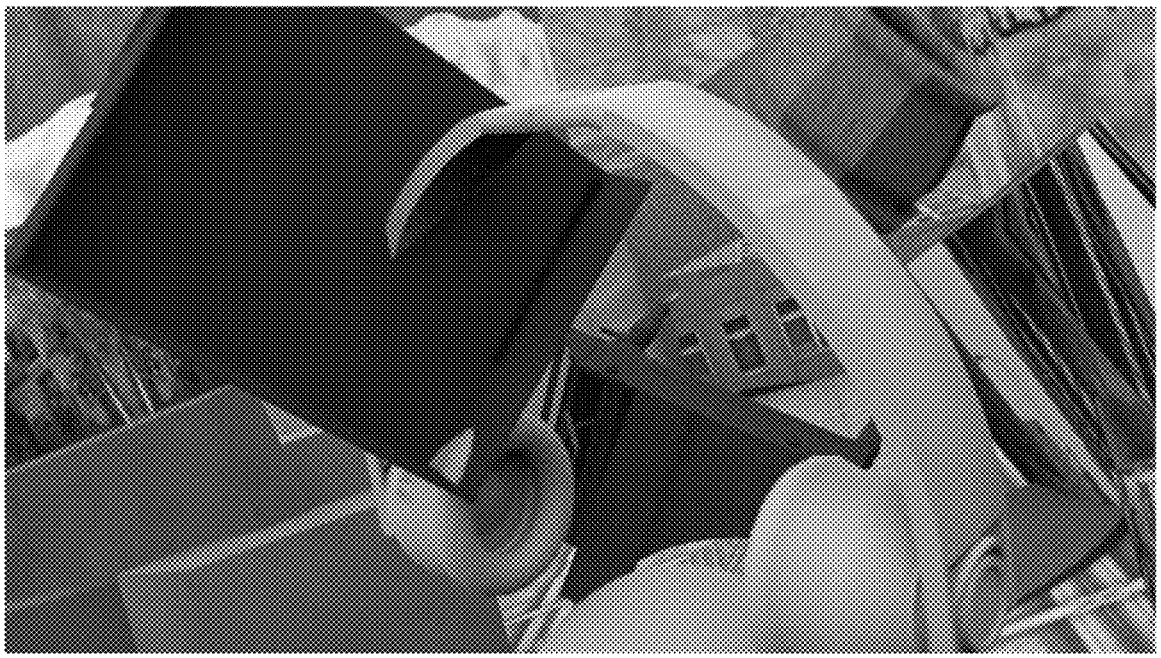
FIG. 11A is an illustration of one of two input images.
Figure 11B:
FIG. 11B is an illustration of the other of two input images.
Figure 11C:
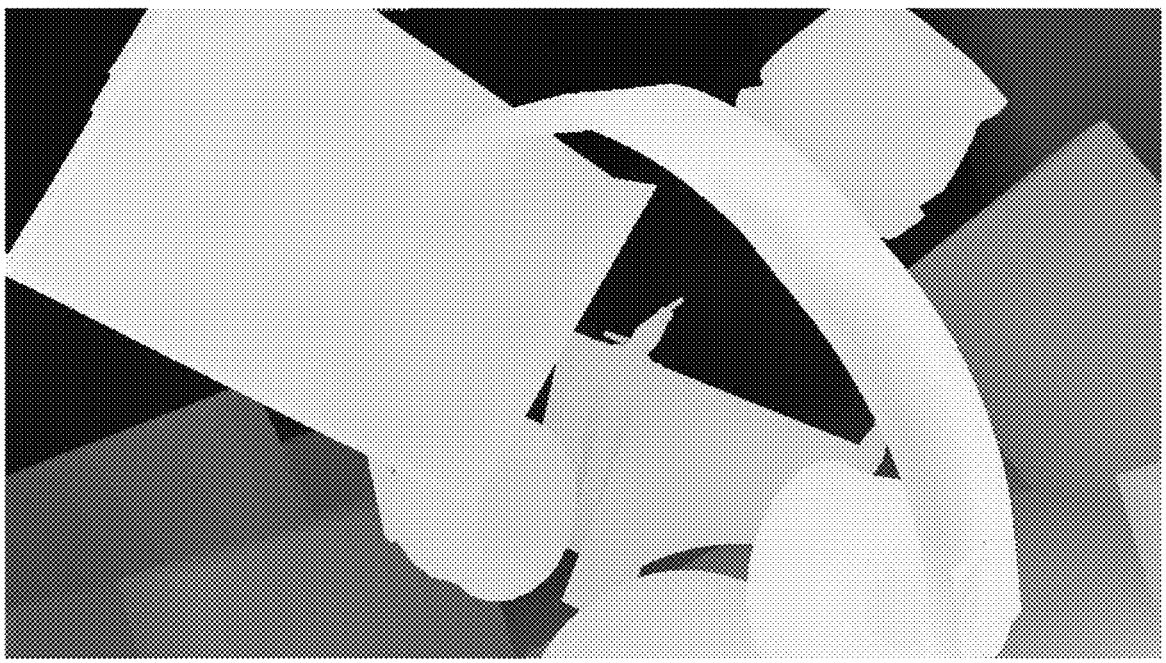
FIG. 11C is a diagram illustrating ground truth for the disparity between the two input images.

Two verification images were then generated with a commercially available stereo camera. FIG. 11A shows one of the two verification images. FIG. 11B shows the other of the two verification images. FIG. 11C shows a true value for the disparity of each pixel in the verification images. The generated two verification images were input to the trained neural network modules in the working example and in the comparative example to verify the accuracy of disparity computed using regression in the working example and in the comparative example.

Figure 12A:
FIG. 12A is a diagram illustrating a computation result of the disparity between the two input images in a comparative example.
Figure 12B:
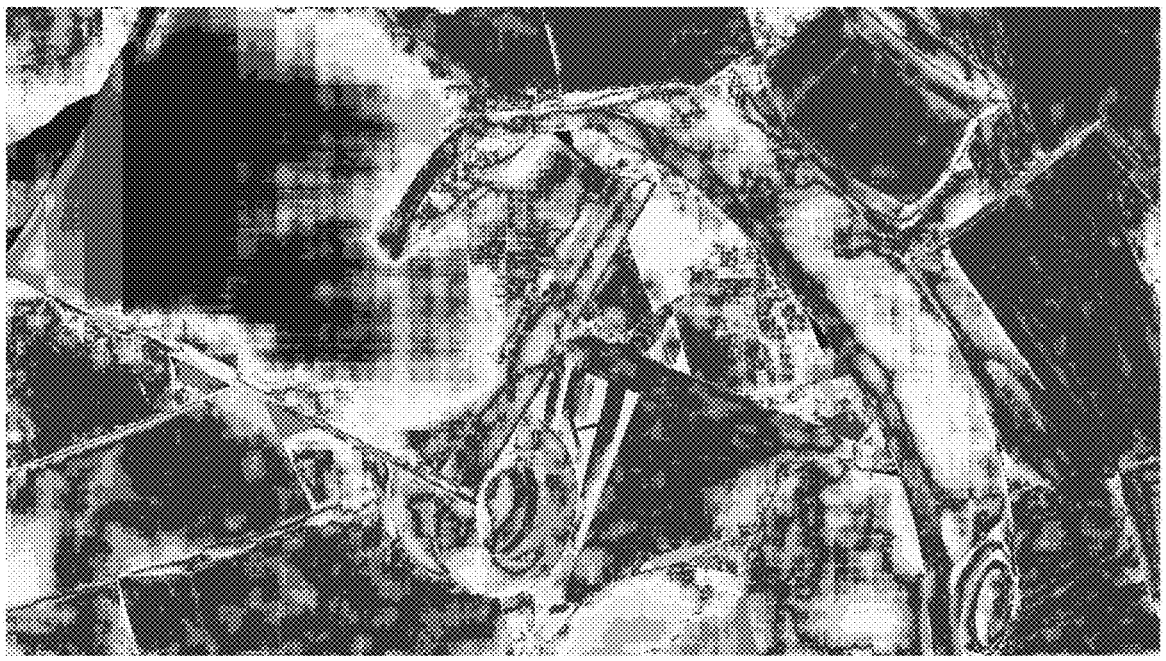
FIG. 12B is a diagram illustrating errors in the computation result in a comparative example.
Figure 13A:
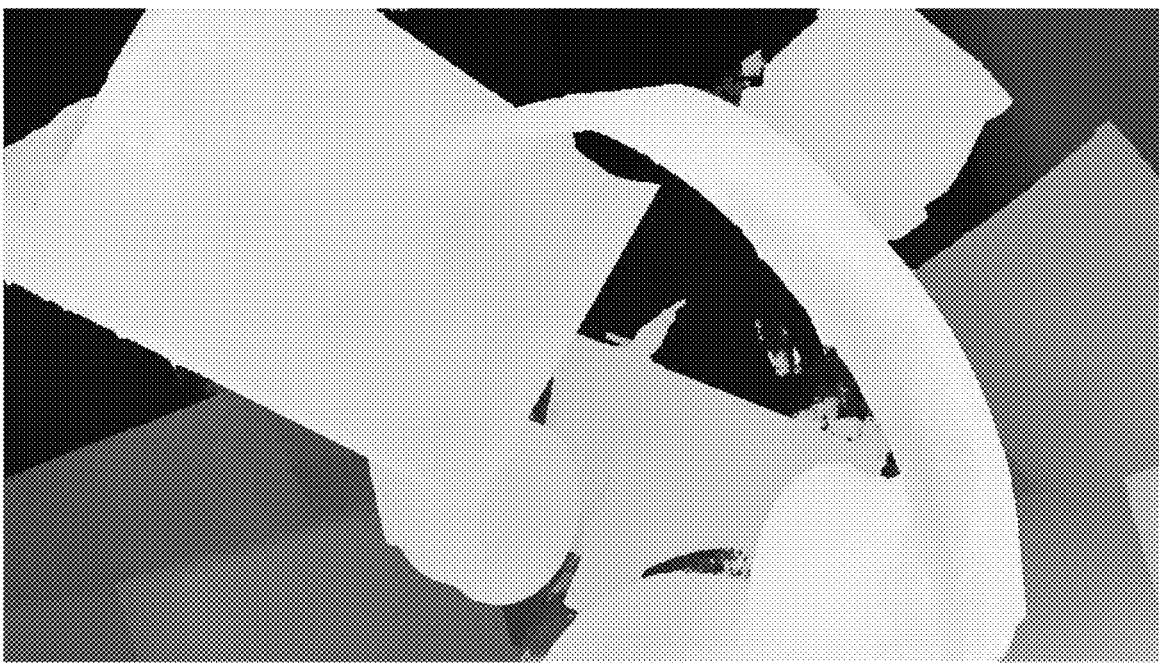
FIG. 13A is a diagram illustrating a computation result of the disparity between the two input images in a working example.
Figure 13B:
FIG. 13B is a diagram illustrating errors in the computation result in a working example.

FIG. 12A shows a regression result of the disparity between the two verification images with the trained neural network module in the comparative example. FIG. 12B shows an error between the regression result shown in FIG. 12A and the true value shown in FIG. 11C. FIG. 13A shows a regression result of the disparity between the two verification images with the trained neural network module in the working example. FIG. 13B shows an error between the regression result shown in FIG. 13A and the true value shown in FIG. 11C.

As shown in FIGS. 12B and 13B, the disparity computed using regression is more accurate in the working example than in the comparative example. In particular, the disparity computed using regression is more accurate for the upper left portion of the object with an unpatterned appearance in the working example than in the comparative example. This verification result shows that the extraction operation included in the operation process for computing a real number (disparity in the experimental example) using regression from images can improve the accuracy of regression. The verification result shows that the accuracy of regression is improved particularly for a portion with a pattern on which disparities are less likely to be projected (e.g., the above unpatterned appearance). The verification result also shows that the replacement with the alternative operation in the phase of backpropagation described above allows the trained neural network module to be generated appropriately.

REFERENCE SIGNS LIST 1 model generation apparatus
11 controller
12 storage
13 communication interface
14 external interface
15 input device
16 output device
17 drive
81 model generation program
91 storage medium
111 data obtainer
112 training unit
113 storing unit
125 training-result data
2 regression apparatus
21 controller
22 storage
23 communication interface
24 external interface 25 input device
26 output device
27 drive
82 regression program
92 storage medium
211 image obtainer
212 regression unit
213 output unit
221 target image
3 training data pair
31 training image
32 true information
5 neural network module
51 input layer
52 intermediate (hidden) layer
53 output layer

The invention claimed is:

1. A model generation apparatus comprising a processor configured with a program to perform operations comprising:
   operation as a data obtainer configured to obtain a plurality of training data pairs each comprising a combination of one or more training images and true information indicating ground truth for a real number to be computed using regression from the one or more training images; and
   operation as a training unit configured to train a neural network module through machine learning using the plurality of training data pairs, wherein
   the neural network module comprises an extraction operation to extract an element satisfying a predetermined condition from a set of targets,
   the machine learning comprises training the neural network module on each of the plurality of training data pairs to compute, from the one or more training images using regression, a value fitting the ground truth indicated by the true information, and
   the processor is configured with the program to perform operations such that operation as the training unit comprises performing, in the machine learning, the extraction operation in a phase of forward propagation with the neural network module and replacing, in a phase of backpropagation, the extraction operation with a differentiable alternative operation, and differentiating the alternative operation to compute an approximate gradient corresponding to differentiation for the extraction operation.

2. The model generation apparatus according to claim 1, wherein
   the neural network module further comprises an operation to compute a likelihood of each of a plurality of candidate values being a real number to be computed using regression, and
   the extraction operation comprises extracting an element of a maximum from the computed likelihoods.

3. The model generation apparatus according to claim 1, wherein
   the one or more training images comprises a plurality of images captured at different positions, and
   the real number to be computed using regression is a disparity between the plurality of images.

4. The model generation apparatus according to claim 1, wherein
   the one or more training images comprises a plurality of images captured continuously, and
   the real number to be computed using regression is an estimate for a motion of an object in the plurality of images.

5. The model generation apparatus according to claim 1, wherein
   the one or more training images comprises images of an object, and
   the real number to be computed using regression is an estimate for a detected position of the object.

6. A regression apparatus comprising a processor configured with a program to perform operations comprising:
   operation as an image obtainer configured to obtain one or more target images;
   operation as a regression unit configured to compute a real number using regression from the obtained one or more target images with a neural network module having been trained thereby; and
   operation as an output unit configured to output information about a regression result, wherein
   the neural network module is trained and generated through machine learning using a plurality of training data pairs each comprising a combination of one or more training images and true information indicating ground truth for a real number to be computed using regression from the one or more training images,
   the neural network module comprises an extraction operation to extract an element satisfying a predetermined condition from a set of targets,
   the machine learning comprises training the neural network module on each of the plurality of training data pairs to compute, from the one or more training images using regression, a value fitting the ground truth indicated by the true information, and
   the processor is configured with the program to perform operations such that operation as the regression unit comprises performing, in the machine learning, the extraction operation in a phase of forward propagation with the neural network module and replacing, in a phase of backpropagation, the extraction operation with a differentiable alternative operation, and differentiating the alternative operation to compute an approximate gradient corresponding to differentiation for the extraction operation.

7. A model generation method implementable with a computer, the method comprising:
   obtaining a plurality of training data pairs each comprising a combination of one or more training images and true information indicating ground truth for a real number to be computed using regression from the one or more training images; and
   training a neural network module through machine learning using the plurality of training data pairs, wherein
   the neural network module comprises an extraction operation to extract an element satisfying a predetermined condition from a set of targets,
   the machine including comprises training the neural network module on each of the plurality of training data pairs to compute, from the one or more training images using regression, a value fitting the ground truth indicated by the true information, and
   training the neural network module comprises performing, in the machine learning, the extraction operation in a phase of forward propagation with the neural network module, and replacing, in a phase of backpropagation, the extraction operation with a differentiable alternative operation, and differentiating the alternative operation to compute an approximate gradient corresponding to differentiation for the extraction operation.

8. The model generation method according to claim 7, wherein
the neural network module further comprises an operation to compute a likelihood of each of a plurality of candidate values being a real number to be computed using regression, and
the extraction operation comprises extracting an element of a maximum from the computed likelihoods.

9. A non-transitory computer-readable storage medium storing a model generation program, which when read and executed, causes a computer to perform operations comprising:
obtaining a plurality of training data pairs each including a combination of one or more training images and true information indicating ground truth for a real number to be computed using regression from the one or more training images; and
training a neural network module through machine learning using the plurality of training data pairs, wherein
the neural network module comprises an extraction operation to extract an element satisfying a predetermined condition from a set of targets,
the machine learning comprises training the neural network module on each of the plurality of training data pairs to compute, from the one or more training images using regression, a value fitting the ground truth indicated by the true information,
the training the neural network module comprises performing, in the machine learning, the extraction operation in a phase of forward propagation with the neural network module, and replacing, in a phase of back-propagation, the extraction operation with a differentiable alternative operation, and differentiating the alternative operation to compute an approximate gradient corresponding to differentiation for the extraction operation.

10. The model generation program according to claim 9, wherein
the neural network module further comprises an operation to compute a likelihood of each of a plurality of candidate values being a real number to be computed using regression, and
the extraction operation comprises extracting an element of a maximum from the computed likelihoods.

11. The model generation apparatus according to claim 2, wherein
the one or more training images comprise a plurality of images captured at different positions, and
the real number to be computed using regression is a disparity between the plurality of images.

12. The model generation apparatus according to claim 2, wherein
the one or more training images comprise a plurality of images captured continuously, and
the real number to be computed using regression is an estimate for a motion of an object in the plurality of images.

13. The model generation apparatus according to claim 2, wherein
the one or more training images comprise images of an object, and
the real number to be computed using regression is an estimate for a detected position of the object.

* * * * *